US011733782B1

(12) United States Patent
Lopes

(10) Patent No.: US 11,733,782 B1
(45) Date of Patent: Aug. 22, 2023

(54) GESTURE SIMULATED INTERACTIVE ENVIRONMENT

(71) Applicant: Infrasoft Technologies Limited, London (GB)

(72) Inventor: Oswald Lopes, London (GB)

(73) Assignee: Infrasoft Technologies Limited, London (GB)

( * ) Notice: Subject to any disclaimer, the term of this patent is extended or adjusted under 35 U.S.C. 154(b) by 0 days.

(21) Appl. No.: 17/687,225

(22) Filed: Mar. 4, 2022

(30) Foreign Application Priority Data

Feb. 21, 2022 (EP) .................................. 22157849

(51) Int. Cl.
*G06F 3/048* (2013.01)
*G06F 3/01* (2006.01)
(Continued)

(52) U.S. Cl.
CPC ............ *G06F 3/017* (2013.01); *G06F 3/0482* (2013.01); *G06F 3/16* (2013.01); *G06V 40/166* (2022.01);
(Continued)

(58) Field of Classification Search
CPC .......... G06F 3/017; G06F 3/0482; G06F 3/16; G06V 40/166; G06V 40/171;
(Continued)

(56) References Cited

U.S. PATENT DOCUMENTS 9,041,766 B1 5/2015 Gates et al.
10,884,503 B2 1/2021 Divakaran et al.
(Continued)

FOREIGN PATENT DOCUMENTS

WO WO-2019220388 A1 * 11/2019

OTHER PUBLICATIONS

Anonymous, "Facial Recognition System—Wikipedia", Retrieved from internet on Apr. 13, 2021; https://en.wikipedia.org/w/index.php?title=Facial_recognition_system&oldid=936610109, 24 pages.
(Continued)

*Primary Examiner* — Aleksey Olshannikov
(74) *Attorney, Agent, or Firm* — Kilpatrick Townsend & Stockton LLP

(57) ABSTRACT

The application relates to a computer-implemented method and system for providing interaction between a user device used by a user and an interactive environment generated by a server. The method may comprise connecting the user device to the server to receive a presentation from a humanoid presenter within the interactive environment; displaying, on a display screen of the user device, the received presentation; capturing, using a camera connected to the user device, at least one image of the user while the presentation is being displayed and processing the at least one image to detect a gesture from the user. When a gesture is detected, the method may further comprise receiving an input from the user; identifying an answer corresponding to the received input; presenting, by the humanoid presenter displayed on the display screen, the received answer to the user; and updating the display of the received presentation.

18 Claims, 24 Drawing Sheets

(51) Int. Cl.
  *G06F 3/0482* (2013.01)
  *G06V 40/20* (2022.01)
  *G06V 40/16* (2022.01)
  *G06F 3/16* (2006.01)
  *H04L 9/40* (2022.01)
  *G09B 7/02* (2006.01)
  *G06Q 40/02* (2023.01)

(52) U.S. Cl.
  CPC .......... *G06V 40/171* (2022.01); *G06V 40/172* (2022.01); *G06V 40/28* (2022.01); *G09B 7/02* (2013.01); *H04L 63/0861* (2013.01); *G06Q 40/02* (2013.01)

(58) Field of Classification Search
  CPC ........ G06V 40/172; G06V 40/28; G09B 7/02; H04L 63/0861; G06Q 40/02
  See application file for complete search history.

(56) References Cited

U.S. PATENT DOCUMENTS

| | | | |
|---|---|---|---|
| 11,270,509 B2 | 3/2022 | Saravanan et al. | |
| 2011/0184865 A1* | 7/2011 | Mon .................... | G07F 19/201 235/379 |
| 2013/0124855 A1* | 5/2013 | Varadarajan ........... | G06Q 20/40 726/4 |
| 2014/0315159 A1* | 10/2014 | Mukherjee ............. | G09B 19/00 434/107 |
| 2016/0087991 A1* | 3/2016 | Matsuoka ............. | H04L 63/102 726/4 |
| 2019/0166119 A1 | 5/2019 | Hecker et al. | |
| 2019/0260966 A1 | 8/2019 | Leatherman, III | |
| 2020/0045509 A1 | 2/2020 | Shmueli | |
| 2020/0064458 A1* | 2/2020 | Giusti ....................... | G01S 7/02 |
| 2020/0218793 A1 | 7/2020 | Storm et al. | |
| 2020/0218973 A1 | 7/2020 | Pi et al. | |
| 2021/0218845 A1* | 7/2021 | Magi ...................... | G06V 40/18 |
| 2021/0327394 A1* | 10/2021 | Bui ........................ | G06V 40/16 |
| 2022/0035439 A1* | 2/2022 | Hollan .................... | G06F 3/017 |
| 2022/0124256 A1* | 4/2022 | Chen .................... | H04N 5/23293 |
| 2022/0180862 A1* | 6/2022 | Sharifi ................... | G10L 15/22 |

OTHER PUBLICATIONS

EP 22157849.5, "European Search Report, dated Aug. 17, 2022", 10 pages.

Ko, et al., "A Novel Affinity Enhancing Method for Human Robot Interaction—Preliminary Study with Proactive Docent Avatar", 2021, 21st International Conference on Control Automation and Systems (ICCAS), ICROS, Oct. 12, 2021, pp. 1007-1011.

* cited by examiner

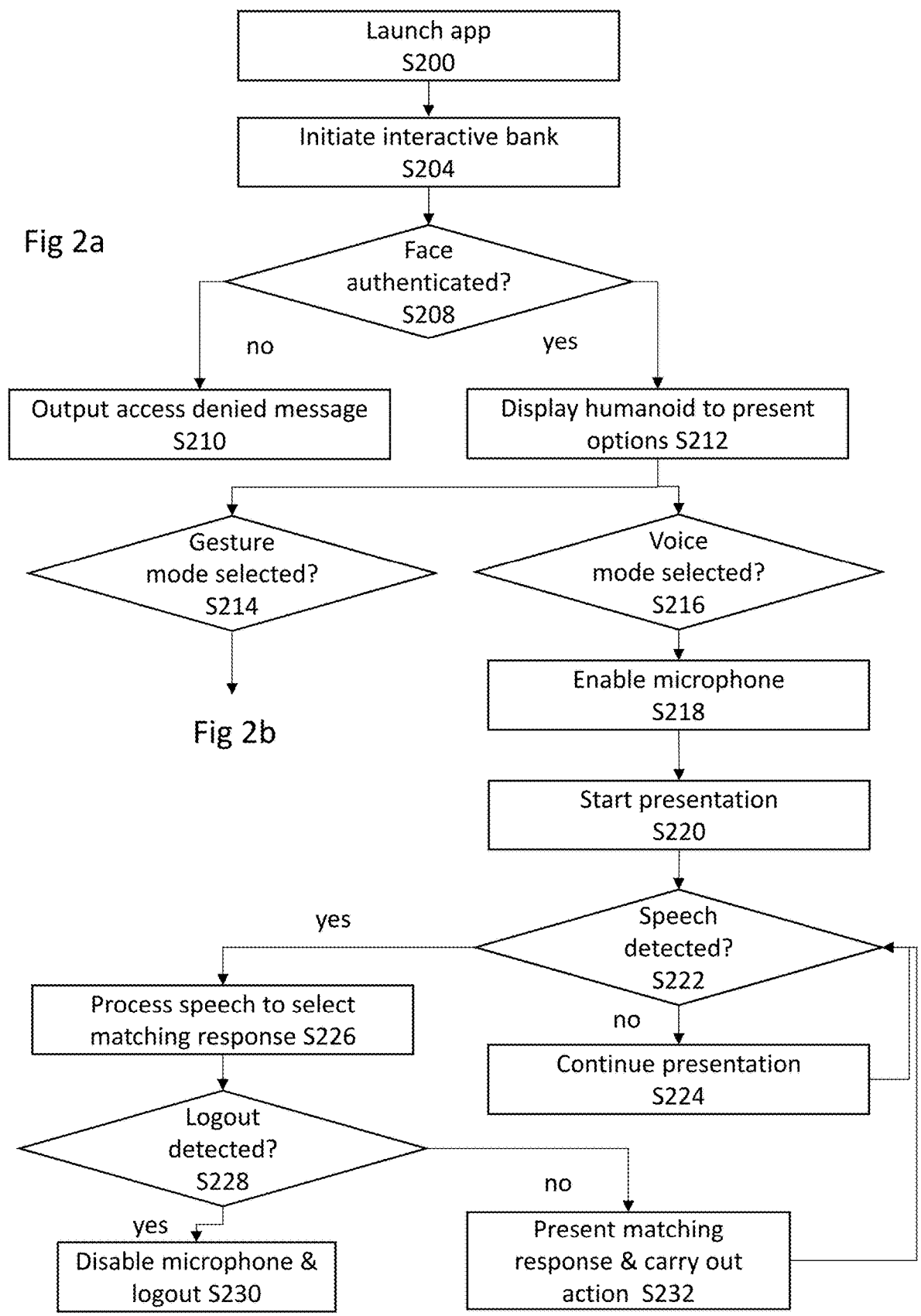

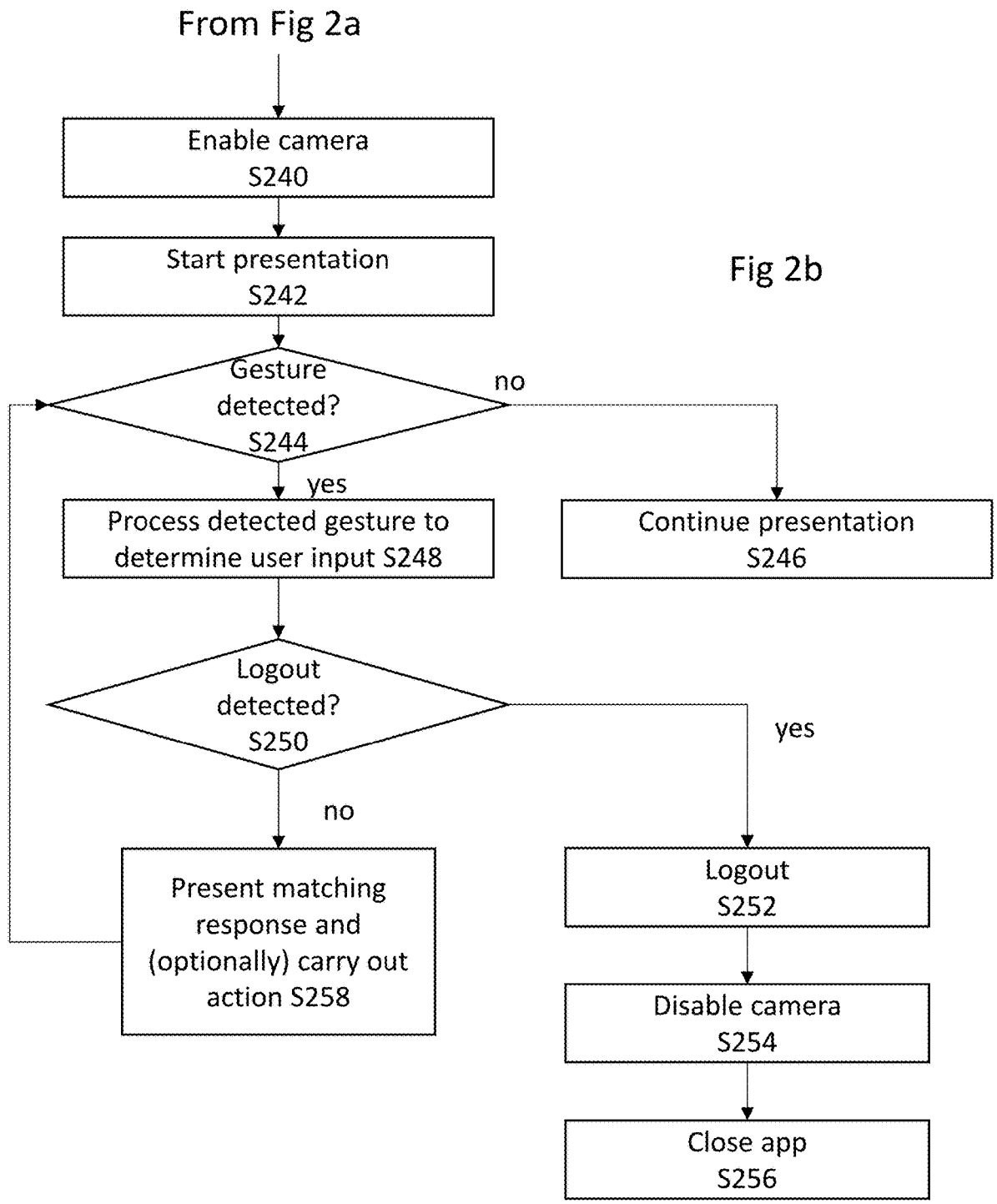

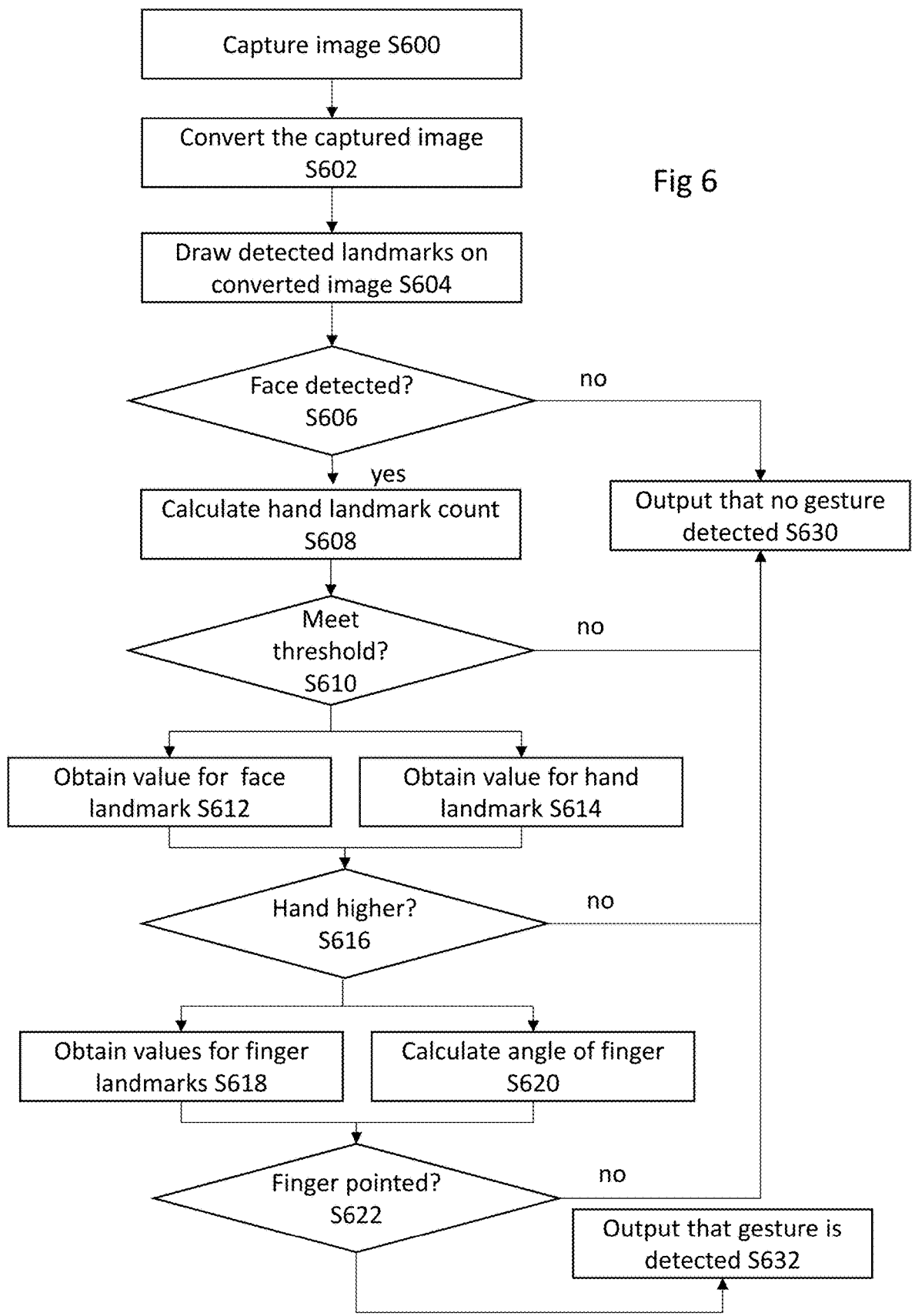

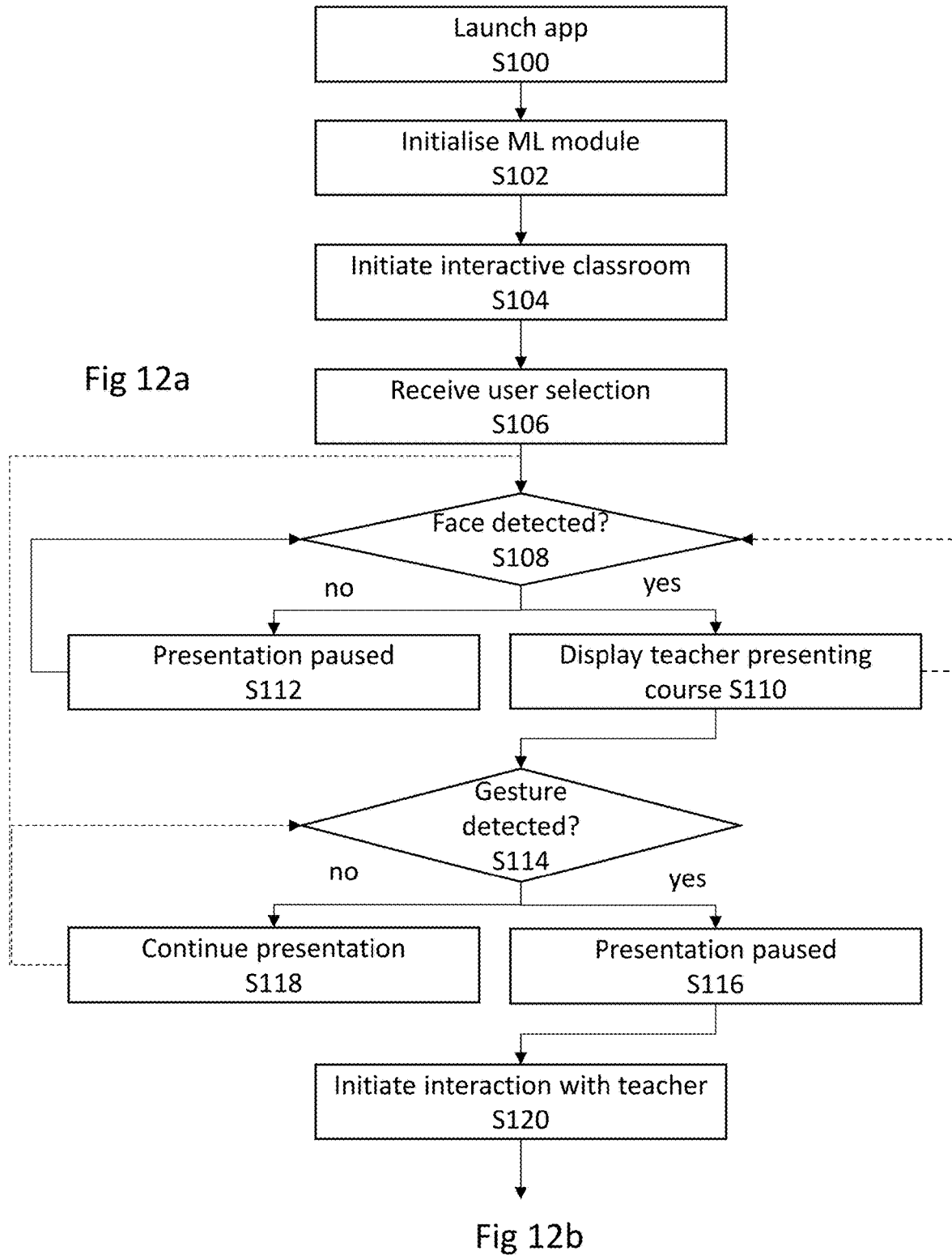

GESTURE SIMULATED INTERACTIVE ENVIRONMENT

FIELD

The present application generally relates to a system for simulating a virtual environment, such as a digital bank branch or a classroom for example a simulation which provides effective two way interaction between a user device and a server providing the simulation.

BACKGROUND

The customer experience in retail banks has shifted from physical to digital channels. Today customers now expect interactions to be simple, intuitive, and seamlessly connected across physical and digital touchpoints.

The current digital experience has allowed the customer a simple interface with the bank for standard banking operations, such as payments, balance enquiry etc. However the customer still has to visit the bank branch to conduct a number of banking activities which require a face to face interaction with the branch personnel. Examples of these are: account opening, loan application, fund investments etc. The current digital experience does not provide the facility for complex banking. For this the customer is required to visit their local branch because it requires face to face interaction with the bank personnel.

The present applicant has recognized the need for a new system for simulating a virtual banking environment in which a user can interact with an assistant. More generally, the present applicant has recognized the need for a new system for simulating a virtual environment in which a user can effectively interact with an interactive environment received from a server.

SUMMARY

There is provided a method, an apparatus and a non-transitory data carrier carrying processor control code to implement the method as set forth in the appended claims. Other features will be apparent from the dependent claims, and the description which follows.

We describe a computer-implemented method for providing interaction between a user device being used by a user and an interactive environment generated by a server. The method may comprise connecting the user device to the server to receive a presentation from a humanoid presenter within the interactive environment; displaying, on a display screen of the user device, the received presentation; capturing, using a camera connected to the user device, at least one image of the user while the presentation is being displayed and processing the at least one image to detect a gesture from the user. When a gesture is detected, the method may further comprise; determining an input from the user; identifying a response corresponding to the determined input; presenting, by the humanoid presenter displayed on the display screen, the received response to the user; and updating the display of the received presentation.

For example, the interactive environment may be a banking environment and the displayed presentation may be selected from a menu of service (or options and the terms can be used interchangeably) and banking information for the user. In this environment, the method comprises connecting the user device to the server to receive a presentation of a menu of the services within the banking environment; displaying, on a display screen of the user device, the received presentation; capturing, using a camera connected to the user device, at least one image of the user while the presentation is being displayed; and processing the at least one image to detect a gesture from the user. When a gesture is detected, the method further comprises identifying a response corresponding to the detected gesture; and presenting, by a humanoid presenter displayed on the display screen, the received response to the user. The identified response may also comprise an action to be carried out on behalf of the user and the method may further comprise issuing an instruction to carry out the action. For example, the action to be executed may be printing a statement, transferring money, or other banking services. The action may be carried out by the user device or the server as appropriate. After the received response has been presented, the steps of capturing, and processing may then be repeated to detect further gestures from the user.

As an alternative example, the user may be a student, the humanoid presenter may be in the form of a teacher, the presentation may be in the form of educational content and the interactive environment may be an educational environment. In this environment, the method comprises connecting the user device to the server to receive a presentation from a teacher within the educational environment; displaying, on a display screen of the user device, the received presentation; capturing, using a camera connected to the user device, at least one image of the student while the presentation is being displayed; and processing the at least one image to detect a gesture from the student. When a gesture is detected, the method further comprises pausing the display of the received presentation; receiving a question from the student; transmitting the received question to a conversation module, wherein an answer corresponding to the received question is selected; receiving the selected response; and presenting, by the teacher displayed on the display screen, the received response to the student. After the received response has been presented, the display of the received presentation is resumed. It will be appreciated that the steps of capturing, and processing may then be repeated continuously while the presentation is being displayed.

We also describe a system for providing an interactive environment, the system comprising: a server which is configured to transmit a presentation from a humanoid presenter within the interactive environment; a user device which is connectable to the server to receive the presentation, the user device comprising a display screen for displaying the received presentation; and a machine learning module. The system also comprises a camera for capturing at least one image of the user while the presentation is being displayed. The machine learning module is configured to process the at least one image to detect a gesture from the user; and when a gesture is detected by the machine learning module, the user device is further configured to: pause the display of the received presentation; receive an input from the user; identify an answer corresponding to the received input; present, by the humanoid presenter displayed on the display screen, the received answer to the user; and resume the display of the received presentation.

In each of the methods and systems described above, there is communication between the user device and the server and actions by the user on the user device result in changes at the server. The method and system thus provide improved interactivity as described in more detail below. The following features apply to the methods and the system above.

The at least one image may be a frame from a video which is captured by the camera. In other words, the user (or student) may be continually monitored by the camera. The camera may be in-built into the user device or may be separate to the user device and connected to the user device using any suitable connection.

The user device may be any suitable electronic device including a mobile phone, a tablet, a personal computer, a laptop, a smart TV, a user terminal and a set-top box. It will be understood that this is a non-exhaustive and non-limiting list of example devices. Such devices are typically readily available in any household and thus the interactive environment can be created without any additional hardware requirements. Merely as an example, the user device may be an Android (™) device running an Android (™) operating system.

The humanoid presenter may be displayed together with the presentation. The displayed humanoid presenter may be in the form of a humanoid avatar to simulate a real-life teacher in the educational environment or an assistant in the banking environment.

The method may further comprise processing the at least one image to detect whether a face of the user is within the at least one image. The face detection may provide a level of security for the banking environment to ensure that only an authorized user gains access to sensitive information such as balance or account data. For example, the face detection may be used as part of the authorization process. Alternatively, when the user's face is not detected, the method may log out the user. Where face detection is not used for security purposes, e.g. in the educational environment, when the user's face is not detected in the at least one image, the display of the received presentation may be paused. The display of the received presentation may not be resumed (or started) until the user's face is detected in the at least one image. In other words, the method may comprise inbuilt face tracking which can detect that the subject is present in front of the camera. This provides one level of interactivity because the presentation will be automatically paused if a user stops watching the user device and will automatically resume as soon as the user is back in front of the camera. This is particularly useful in the educational environment to ensure that the student is following the lesson.

In addition to the interactivity provided by face tracking or as a stand-alone, interactivity is provided by the detection of the gesture which allows the user to interact with the humanoid presenter (also termed instructor or assistant and the terms can be used interchangeably). For example, in the educational environment, this interaction gives a student the real time experience to behave as they would in an actual classroom setting. Similarly, when using the banking application, a user has the impression that they are interacting with a real-life assistant.

Detecting whether a face of the user is within the at least one image may comprise detecting a plurality of face landmarks within the at least one image, calculating a co-ordinate value for a key face landmark, wherein the co-ordinate value is indicative of the location of the key face landmark within the image; and determining whether the co-ordinate value is within a field of view of the camera. The key face landmark may be a nose landmark or a combination of face landmarks. Determining whether the co-ordinate value is within a field of view of the camera may comprise defining a boundary area around a central portion of the at least one image and determining whether the co-ordinate value is within the central portion. The co-ordinate value may comprise a x coordinate value and a y coordinate value. Determining whether the co-ordinate value is within a field of view of the camera may comprise determining whether the x coordinate value is between a minimum value and a maximum value for the x coordinate value of the at least one image and determining whether the y coordinate value is between a minimum value and a maximum value for the y coordinate value of the at least one image. When both conditions are met, the method may output that a face is detected.

Processing the at least one image to detect a gesture from the user may comprise detecting whether a hand is present in the image. Detecting whether a hand is present in the image may comprise detecting a plurality of hand landmarks within the at least one image, and determining whether the detected plurality of hand landmarks exceeds a hand landmark threshold. The hand landmarks may be detected using a holistic graph which may comprise a fixed number of landmarks (e.g. 21). Merely as an example, the hand landmark threshold may be 20 (i.e. over 95% of the total).

When both a hand and a face are detected in the at least one image, processing the at least one image to detect a gesture from the user may comprise determining the relative location of the hand to the face. For example, when the gesture is a hand being raised which is indicative of a student wishing to ask a question in the educational environment, the hand is typically higher than a user's face. Detecting a gesture may comprise obtaining a co-ordinate value for a key face landmark, and obtaining a co-ordinate value for a key hand landmark. The co-ordinate value may comprise a y coordinate value. The y co-ordinate values for each of the key face landmark and the key hand landmark may be compared and a gesture may be detected when the y co-ordinate value for the key hand landmark is greater than the y co-ordinate value for the key face landmark. The key face landmark may be an ear landmark. The key hand landmark may be a wrist landmark.

Processing the at least one image to detect a gesture from the user may comprise detecting whether at least an index finger of the user is pointed. Processing the at least one image may comprise obtaining a first co-ordinate value for a first landmark on the index finger and a second co-ordinate value for a second landmark on the index finger. For example, the first landmark may be a tip of the index finger and the second landmarks may be a middle joint on the index finger. The co-ordinate value may comprise a y coordinate value. They co-ordinate values for each of the first and second landmarks may be compared and a gesture (i.e. pointed finger) may be detected when the y co-ordinate value for the first landmark is greater than the y co-ordinate value for the second landmark. The method may further comprise calculating an angle of the finger by drawing a line between the first and second co-ordinate values and calculating the angle of the line. A gesture may be detected when the angle of the line between the landmarks and a vertical axis is less than an angle threshold (e.g. 45 degrees).

In particular, in the banking environment, determining the input from the user may comprise processing the at least one image to determine how many landmarks from different fingers are detectable. Based on the determined number of landmarks from different fingers, the response may be identified. For example, the number of different fingers may be indicative of a selection of an option in a menu of options which is being displayed on the display screen. The identified response may be a sub-menu of options and presenting the identified answer comprises an audio output describing each option and its associated gesture. When a sub-menu of options is presented, the method may further comprise repeating the capturing and processing steps to identify the user's selection from the sub-menu. Alternatively, the identified response may be data and the method may further comprise connecting to a database (e.g. a core banking database) to retrieve the data (e.g. account information).

Processing the at least one image may comprise detecting a gesture indicative of the user wishing to exit the application. For example, in the banking environment, the gesture indicative of exiting may be displayed in a sub-menu. When the gesture is detected, the camera of the user device may be disabled. The application may also be closed.

Before displaying the received presentation, the method may comprise processing the at least one image to detect whether a face of the user is within the at least one image; and analyzing the detected face to authenticate the user. Authenticating a user may be particularly useful for the banking environment to protect access to confidential banking information. However, it may also be done in other interactive environments to increase security.

In the educational environment, when the presentation is paused, the method may further comprise displaying an interaction from the teacher in which the teacher prompts the student to ask a question. The question may be received from the user by automatically enabling a microphone when the gesture is detected. The microphone may be in-built in the user device or separate to the user device and connected using any suitable connection. The question may be recorded by the user device. The method may further comprise detecting the end of speech from the user. When the end of speech is detected, the microphone may be automatically disabled. The end of speech may be detected by a machine learning module. The end of speech may be detected by determining the frequency of the speech and comparing the frequency to a frequency threshold.

The received question may be converted from speech to text for further processing. The received question may be sent to a conversation module to identify a corresponding answer, e.g. from a database of question and answer pairs. The corresponding answer may be in text and may be converted from text to speech for presentation to the student by the teacher. In other words, there is a conversational capability within the interactive educational environment. During the presentation by the teacher (i.e. during the online course), when a gesture is detected, the presentation may be paused so that the teacher may then interact with the student. For example, the teacher may ask "What is your question" and after the processing of the received question, the teacher may provide a verbal answer. The teacher may also be configured to provide a follow-up query to confirm that the received answer was acceptable. When the user indicates that the received answer was not acceptable, the previous steps may be repeated. Otherwise, the presentation of the course content may be continued.

The present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realized in the form of a data carrier having functional data thereon, said functional data comprising functional computer data structures to, when loaded into a computer system or network and operated upon thereby, enable said computer system to perform all the steps of the above-described method.

BRIEF DESCRIPTION OF THE DRAWINGS

For a better understanding and to show how embodiments may be carried into effect, reference will now be made, by way of example only, to the accompanying diagrammatic drawings in which:

FIGS. 2a and 2b combine to form a flow chart showing the steps which may be carried out in the system of FIG. 1 to simulate a virtual banking environment;

FIG. 6 is a flowchart showing one method for detecting whether a gesture has been made by the user which necessitates interaction with the teacher;

FIGS. 12a and 12b combine to form a flow chart showing the steps which may be carried out in the system of FIG. 1 to simulate a virtual educational environment;

DETAILED DESCRIPTION OF THE DRAWINGS

Figure 1:
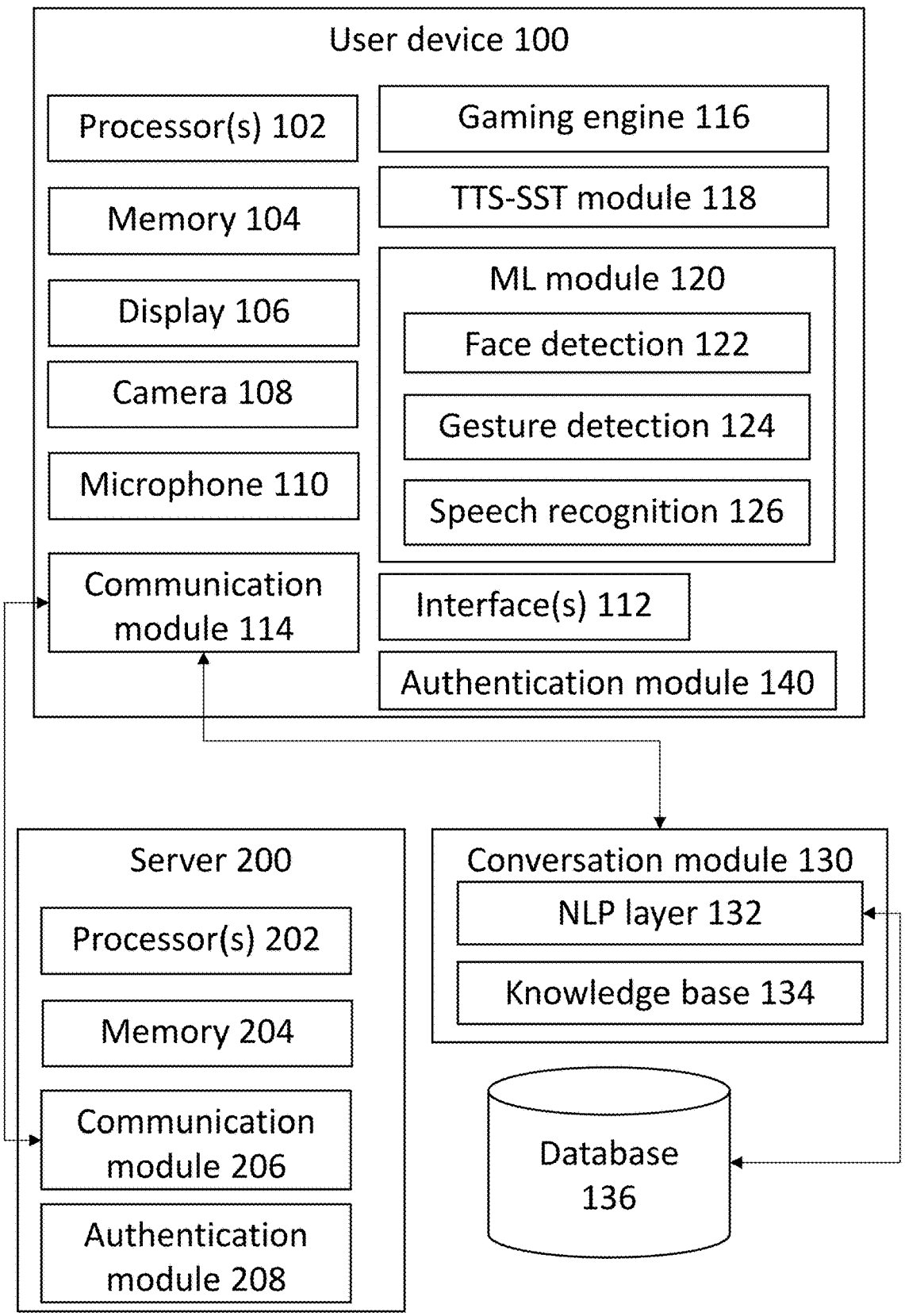
FIG. 1 is a block diagram of an interactive system which simulates a virtual environment.

FIG. 1 is a block diagram of a system for simulating an interactive environment, e.g. an interactive educational environment and/or an interactive banking environment depending on the appropriate selection of an app by a user. The system comprises a user device 100 which is any suitable electronic device including a mobile phone, a tablet, a personal computer, a laptop and a smart TV. It will be understood that this is a non-exhaustive and non-limiting list of example devices. As explained in more detail below, the system uses existing hardware and by using a gaming engine 114 requires minimalistic hardware. The user device 100 may be an Android (™) device running an Android (™) operating system and may run any suitable operating system. The gaming engine 114 may be any suitable engine such as Unity (™) or Unreal (™). Examples of applications by Unity (™) include Shapes, Nano Simbox and 3D Bear AR.

The user device 100 comprises the standard components such as one or more processors 102 and memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example. It will be appreciated that there may be other standard components which are not shown merely for ease of illustration. For example, the user device 100 may comprise or be connected to a printer to allow any information which is transmitted from the server to be printed out, e.g. account information for the banking environment or a lesson/test for the educational environment.

The user device 100 comprises a display 106 for displaying the interactive environment. For the educational environment, the displayed environment may include a display of a teacher which may be in the form of a humanoid avatar. Similarly, for the banking environment, the displayed environment may include a display of an assistant teacher which may be in the form of a humanoid avatar. Additional content may also be displayed, e.g. a menu of options or banking information for the banking environment or educational content for the educational environment. The content to be displayed may be provided from a server 200 which is connected to a communication module 114 in the user device 100 via any suitable communication. The server 200 may be located remotely (i.e. in a different location to the user device) For example, when the user device 100 is a television, the content may be displayed on a channel which is delivered to the television via any suitable mechanism, e.g. via a set top box or direct using live streaming via the Internet, broadband (fibre) or a cable network or satellite or using an over-the-top (OTT) media service which may be accessed over the Internet. The latter allows the service to be accessible in the remotest parts of the world.

Like the user device 100, the server 200 comprises typical standard components and some of these components are shown such as one or more processors 202, memory 204 and a communication module 206 to connect to one or more user devices 100. The server 200 may be any suitable computing device and the functionality of the server 200 may be split across multiple devices.

The user device 100 comprises a microphone 110 which allows a user (e.g. a student in the educational example) to enter or input voice commands. For example, in the interactive educational environment, a user is able to choose or navigate the enrolled courses or subjects based on their grade using the voice commands. Merely for illustration, a user may say 'Grade1' to choose the grade and say 'Science' to choose the subject. Once the subject is selected, it takes the student to the virtual classroom environment where the virtual teacher teaches the topic or lessons. Similarly, in the interactive banking environment, a user is able to make selections using voice commands. As explained in more detail below in all environments, the user commands may be processed by converting the voice into text using a TTS-SST (text to speech and speech to text) module 118. A matching action for the converted text may be found using any suitable algorithm, e.g. the well-known Soundex algorithm and the matching command is then carried out.

The use of voice commands means that the service provided by the app may optionally be navigated on a hand's free device. In other words, the user device 100 may not need a keyboard, mouse, or other input interface to access the interactive system. However, as shown the user device 100 may optionally have one or more interface(s) 112 to allow a user to provide additional input. These interfaces may be any suitable means for inputting commands, e.g. a keyboard or mouse, where used.

The user device 100 comprises a camera 108 which may be any suitable device such as a camera integrated into a mobile phone or a separate camera which is connected via a wired or wireless connection to the user device, e.g. a camera placed on top of a smart TV. The camera is used as explained below to capture an image of the user's face to ensure that the environment is interactive. For example, in the educational environment, the content of the course is typically only presented by the teacher when the face of the student is in front of the camera. When a student is not sitting in front the camera, the course will typically be paused and only resumed when the student is back in front of the camera and the face is detected. This is to make sure that student is always watching and listening to the lessons taught by the virtual humanoid teacher throughout the course.

In all examples, the detection of the user's face may be done using a face detection component 122 of a machine learning module 120 which has been appropriately trained. The machine learning module 120 may be any suitable module, for example a plugin such as MediaPipe (™).

Further interactivity may be provided by detecting hand gestures from a user. For example, so that in the educational environment the student has the real time experience of attending a classroom session sitting in front of a teacher or in the banking environment, the user can input a selection. The hand gesture may be captured by the camera 108 and processed by a gesture detection component 124 of a machine learning module 120 which has been appropriately trained. As an example, the hand gesture may be raising of a hand and the interactivity may be to interrupt the session. Various criteria may be used to assess the hand gesture position such as whether the wrist point is above the ear point, whether the index finger is pointed and whether the face is visible in the camera field of view.

In addition to the face and gesture detection components, the machine learning module 120 may comprise a speech recognition component 126 which may be used to detect when a user has finished speaking. The system may thus be considered to be AI powered. It will be appreciated that although the machine learning module 120 may be part of the gaming engine 114. In the educational environment, when a gesture is detected by the machine learning module 120, the course content may be paused and the microphone 110 may be enabled automatically. The student is then able ask a question and the speech recognition component 126 automatically detects the end of speech (i.e. the end of the question). The spoken question may be converted to text by the TTS-SST (text to speech and speech to text) module 118. The converted text may then be sent to a conversation module 130 which typically is located in a different device to the user device. The conversation module 130 may be located in the server 200 or separate from the server 200 as illustrated in FIG. 1.

The conversation module 130 is automatically connected so that the question can be interpreted by a natural language processing (NLP) layer 132 within the conversation module 130. As shown, the conversation module 130 comprises a knowledge base 134 and is connected to a database 136 so that an appropriate response to the student's question can be provided. The response may be provided as text back to the user device and converted back to speech by the TTS-SST module 118. The conversation module may be an AI powered conversation BOT. Further information on the conversation module 130 is provided below.

The user device 100 may optionally comprise an authentication module 140 which together with a corresponding authentication module 208 in the server may be used to authenticate a user, e.g. by taking an image of the user. Such authentication may be carried out using known methods and is typically important when confidential information is being provided to the user from the service, e.g. in the banking environment.

Figure 2C:
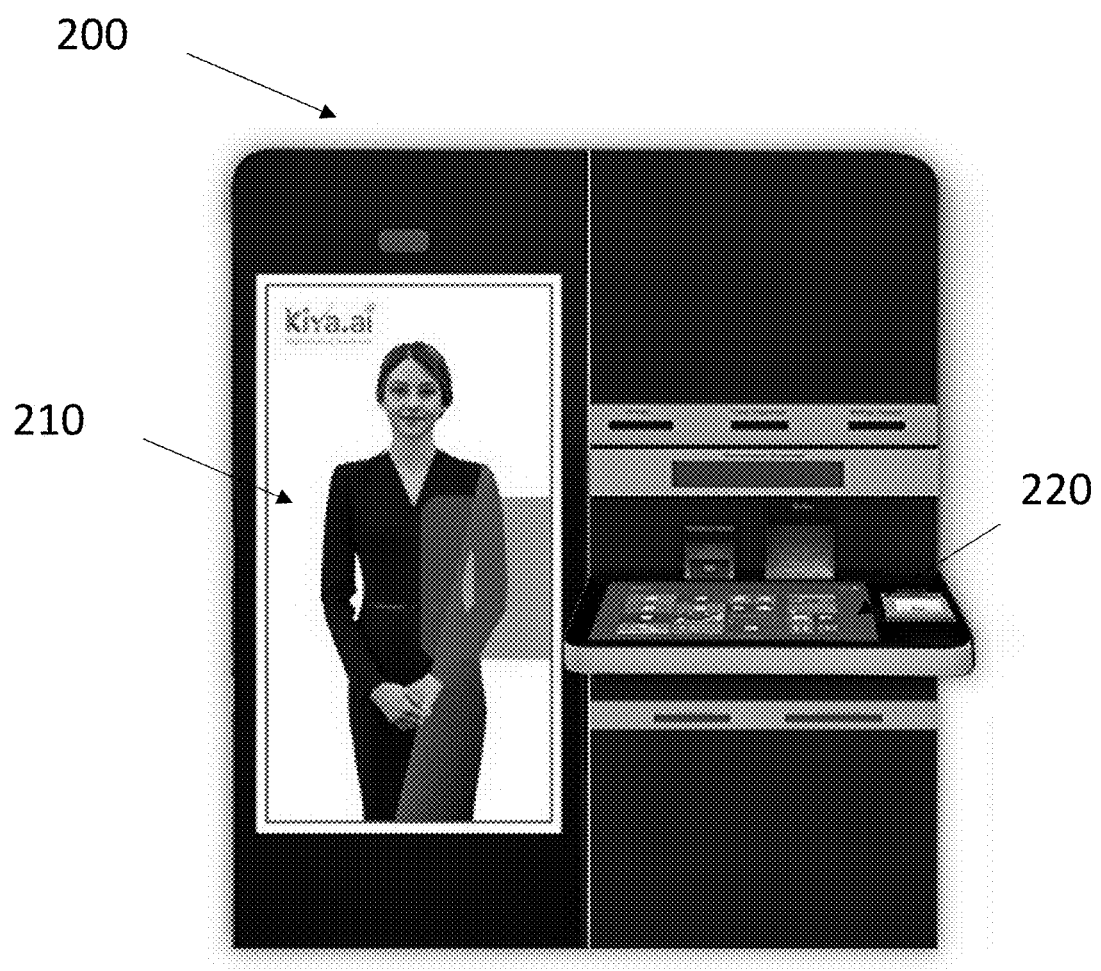
FIG. 2c is a drawing of a user device which may be used in the system of FIG. 1.

FIGS. 2a and 2b show the steps which may be carried out by the system of FIG. 1 to generate the interactive banking environment. FIG. 2c is an illustration of a terminal (user device) which may be used by a user to generate the interactive banking environment. The terminal 200 comprises a screen 210 for displaying the presentation including the avatar of a banking assistant as well as an input device 220. The input device 220 comprises a touch screen to allow a user to input information. The terminal 200 also comprises a camera for scanning a user's face or another means of identification, e.g. a QR code, which may be used to authenticate as described below. The terminal 200 may also comprise a printer so that the user (i.e. the customer) can get a physical print out of any information which has been presented on the screen, including account information or an invitation for a face-to-face meeting with the manager. The terminal 200 may also comprise a scanner or other similar input mechanism to allow a user to deposit a cheque or cash.

In a first step S200, a user launches the interactive banking app on the user device and thus the user device is connected to the server to receive the data to display the interactive banking environment. After launch as described above, there may be an initialization of the machine learning module comprising the face, gesture, and speech detection modules (where used). The interactive banking environment is also initiated at step S204. Once the banking environment is initiated, the user's face is authenticated at step S208 using the authentication modules in the user device and the server shown in FIG. 1. Alternatively the user can scan an QR code (or other identification) and authenticate using the bank aligned authentication methods for digital interaction.

Figure 2D:
FIGS. 2d and 2e are screenshots of presentations which may be displayed on the user device of FIG. 2c.

When the authentication is not successful, a message indicating that the user is denied access is output (e.g. via an audio or visual message). When the authentication is successful, the banking assistant in the form of a humanoid avatar may be displayed at step S212. Merely as an example of a suitable display, FIG. 2d is a screenshot of the displayed presentation on a user device showing the interactive banking environment and avatar. The options first displayed at step S212 may be to select gesture mode or to select voice mode. The user may make this selection using any suitable input, e.g. by voice which is processed by the TTS-SST module or by using an input device such as a touch screen or keyboard. In gesture mode, the user is able to continue by making gestures which are automatically detected by the user device as explained below. In voice mode, the user is able to continue by making verbal selections. When gesture mode is selected as shown at step S214, the steps shown in FIG. 2b follow.

When voice mode is selected as shown at step S216, the microphone is enabled (step S218). The presentation may then begin at step S220. The presentation may include an artificial assistant in the form of an avatar or humanoid describing the various options which are available to the user and the associated voice command for each option. A table below gives an illustrative example of the options:

| Option/Service | Voice command |
|---|---|
| Account services | Say "one" |
| Card services | Say "two" |
| Loan services | Say "three" |
| Cash services | Say "four" |
| Logout | Say "five" |

In addition to the verbal presentation of the options, the menu of options may also be displayed visually for the user. The next step is to check whether a user has spoken at step S222. If no speech is detected, the presentation may continue (both verbally and/or visually) at step S224. When speech is detected, the speech may be processed to check the matching response at step S226.

The speech may be processed by converting the voice into text using the TTS-SST (text to speech and speech to text) module. A match for the converted text may be found using any suitable algorithm, e.g. the well-known Soundex algorithm. Alternatively, the processing of the speech may comprise using the machine learning module to determine whether the end of the speech is detected (as described below). If the end is not detected, the user device continues receiving the question from the user. The processing of the received speech may also comprise converting from speech to text and sending the text version of the received speech to the conversation module. The conversation module may then compare the received text conversion to inputs stored in its associated database. If any inputs in the database match the received text conversion, the corresponding response in the database is selected. In this example, the corresponding response is a command.

There may be a check to see if the matching response is a command to logout as indicated at step S228. When a logout command is detected, the microphone is disabled and the app is closed as indicated at step S230. In other words logout is affected. When the matching response is not a logout command, the matching response is presented and any associated actions carried out at step S232. The matching response may include an action which is to be carried out on behalf of the user, e.g. issuing a printout of banking information and/or transfer of money or any related banking transaction.

The matching response may be another menu of options/services (e.g. a sub-menu). For example if the input is identified as the user saying "one", the matching response may be to present in an audio and visual presentation the various options/services which are available to the user and the associated voice command for each option. A table below gives an illustrative example of the options:

| Option/Service | Voice command |
|---|---|
| Balance Enquiry | Say "one" |
| Mini Statement | Say "two" |
| Account Statement | Say "three" |
| Fund Transfer | Say "four" |
| Logout | Say "five" |

By presenting the output orally by the artificial assistant, it appears that the assistant has reacted to and responded to the user's input. Once the sub-menu has been presented, the presentation can be continued and the process continually loops back to detect whether any further speech has been detected at step S222. When another interaction from the user is detected, this is processed at step S226 to select the matching response. This may be another sub-menu or may be information, e.g. if "one" is detected, the user's balance may be displayed.

Figure 2E:
Figure 2F:
FIGS. 2f and 2g are screenshots of updated presentations which may be displayed on the user device of FIG. 2c.

Alternatively, when gesture mode is selected as shown at step S214, the camera is enabled (step S240), in the event that the camera is not already on. The presentation may then be updated at step S242 and examples of this presentation are shown in FIGS. 2e and 2f. The presentation may be the same as for the voice mode and include an artificial assistant in the form of an avatar or humanoid describing the various options which are available to the user and the associated voice command for each option. The options may be the same as in the table above:

| Option | Gesture command |
|---|---|
| Account services | Show one finger |
| Card services | Show two fingers |
| Loan services | Show three fingers |
| Cash services | Show four fingers |
| Logout | Show five fingers |

In addition to the verbal presentation of the options, the menu of options may also be displayed visually for the user. The next step is to check whether a gesture has been detected at step S244. If no gesture is detected, the presentation may continue (both verbally and/or visually) at step S246. When a gesture is detected, the gesture may be processed to check the matching response at step S248. The hand gesture may be processed as explained in more detail below by overlaying a graph of hand landmarks and determining which landmarks from which fingers are detectable.

There may be a check to see if the matching response is a command to logout as indicated at step S250. When a logout command is detected, i.e. by detecting that a user is showing all five fingers, there is a logout at step S252, the camera is disabled at step S254 and the app is closed as indicated at step S256. When the matching response is not a logout command, the matching response is presented at step S258. As above, there may also be an action which is triggered by the user input and if there is one, this action may also be carried out. The action may be carried out by the user device, e.g. by issuing a command to a printer to print out a balance statements, or by the server, e.g. to initiate a transfer. Thus, carrying out an action may comprise issuing an instruction to do so. The instruction may be issued from the user device to the server as appropriate.

The matching response may be another menu of options (e.g. a sub-menu). For example if the input is identified as the user showing one finger, the matching response may be to update the display to present in an audio and visual presentation the various options which are available to the user and the associated voice command for each option. A table below gives an illustrative example of the options:

| Option/Services | Voice command |
|---|---|
| Balance Enquiry | Show one finger |
| Mini Statement | Show two fingers |
| Account Statement | Show three fingers |
| Fund Transfer | Show four fingers |
| Logout | Show five fingers |

Figure 2G:

Once the sub-menu has been presented, the presentation can be continued and the process continually loops back to detect whether any further gesture has been detected at step S244. When another interaction from the user is detected, this is processed at step S248 to select the matching response. This may be another sub-menu or may be information, e.g. if one finger is detected, the user's balance may be displayed. Alternatively, the mini statement, account statement or fund transfer window may be presented dependent on the selection by the user. When the information being presented is data from the user's bank account, there may be a further step of connecting to the relevant database to retrieve the information and then there is an update to the display and merely as an example FIG. 2g shows the account balance.

Throughout the process shown in FIGS. 2a and 2b, there may be face detection to determine whether the user's face is detected. When the user's face is not detected, the process may be logged out (e.g. the user moving away from the screen may be interpreted as a gesture to log out). This helps ensure that no sensitive information is accessed by another individual.

Figure 3:
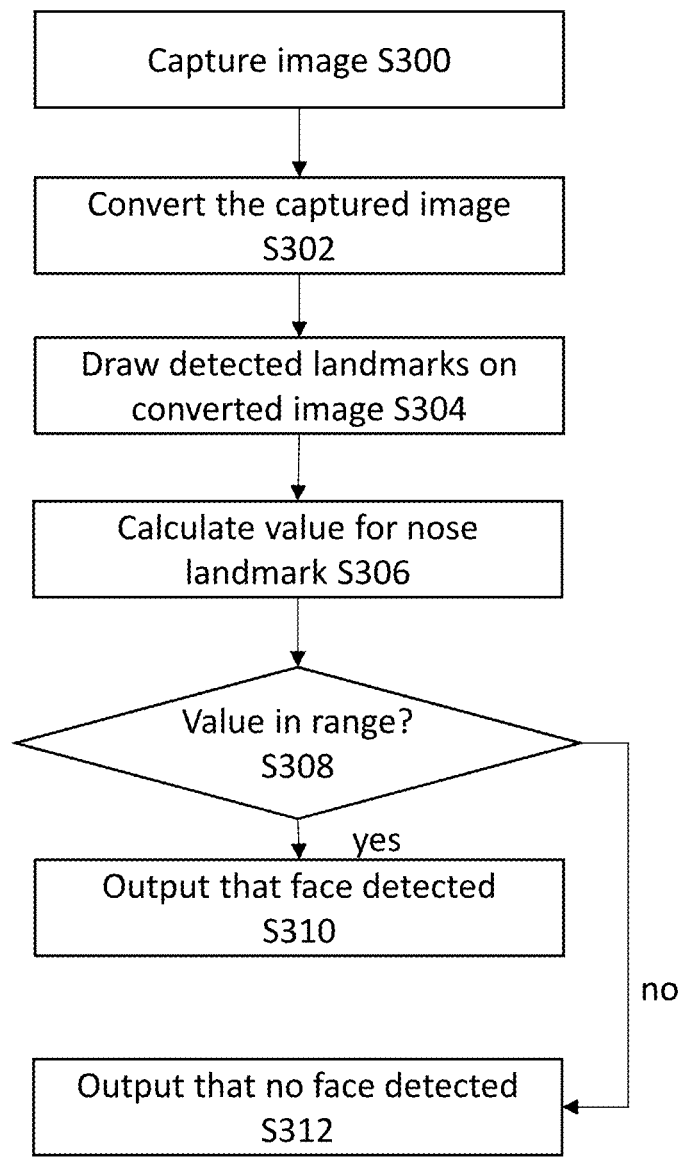
FIG. 3 is a flowchart showing the steps for detecting whether a user's face is in the correct location for the presentation to be displayed.

FIG. 3 illustrates one method for detecting whether a user's face is in the correct location for the authentication process and/or for optionally for additional interactivity when it is required that the user is in front of the camera for the presentation to be displayed. In a first step S300, an image (e.g. an image frame from a webcam feed) is captured. In the next step S302, the image may be subject to any optional conversion (e.g. from a BGR image to an RGB image) which is needed prior to detecting landmarks on the image as shown at step S304. These first steps of the face detection process may be done using any suitable application which captures images and determines landmarks. For example, when the Unity (™) gaming engine is used, the WebCam Texture component in this environment may be used to capture the frames continuously from the camera, convert them and then draw the detected landmarks on the image.

Figure 4A:
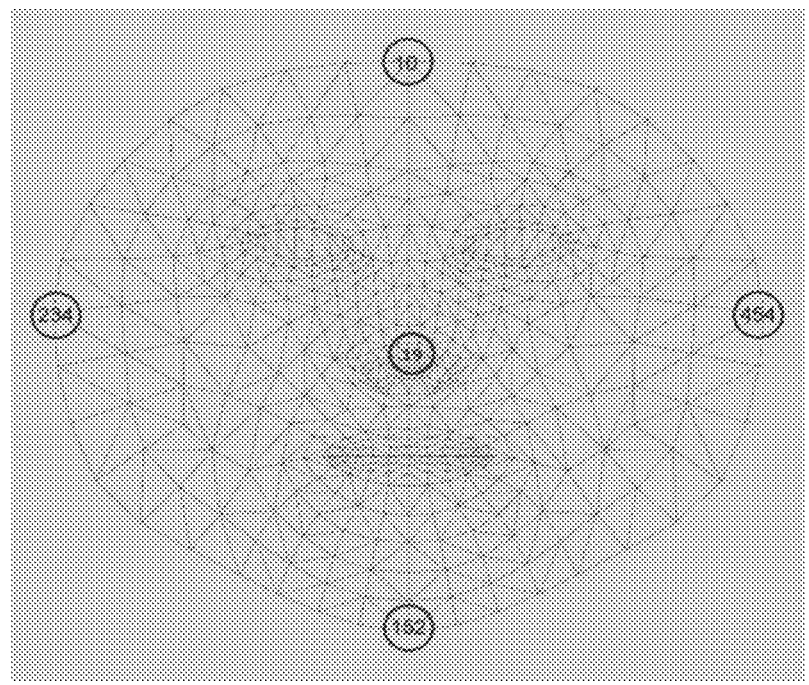
FIG. 4a is a holistic graph showing face landmarks.
Figure 4B:
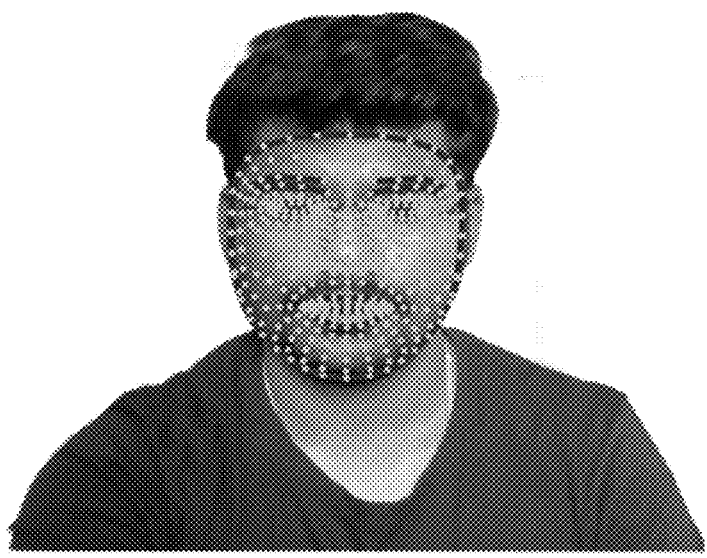
FIG. 4b is a sample image with the graph of FIG. 4a overlaid on a face.

The next stage is to calculate a value(s) for the nose landmark at step S306, for example using a holistic graph comprising a plurality of landmark points such as that shown in FIG. 4a. This example of a holistic graph has 468 points for a face and is provided in the Mediapipe (™) module. FIG. 4b illustrate the holistic graph overlaid on an image captured by the camera.

Each landmark is composed of x, y, and z coordinates. The x and y coordinates are normalized between 0 and 1 by the image width and height respectively. The nose point is denoted as Landmark point "19" and its normalized position is identified on each image. The x and y normalized landmark coordinates may then be multiplied by the width and height resolution of the image respectively to match the aspect ratio of the image to give X and Y values for the nose landmark. These values may be stored in a vector structure.

Figure 5A:
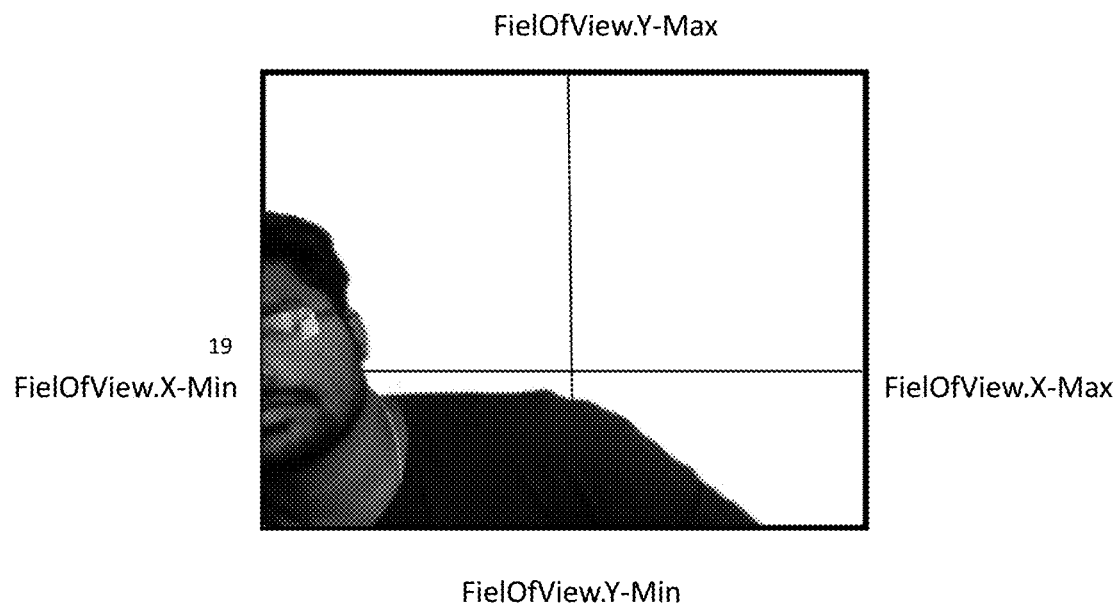
FIGS. 5a to 5c show images analyzed using the method of FIG. 3.
Figure 5B:
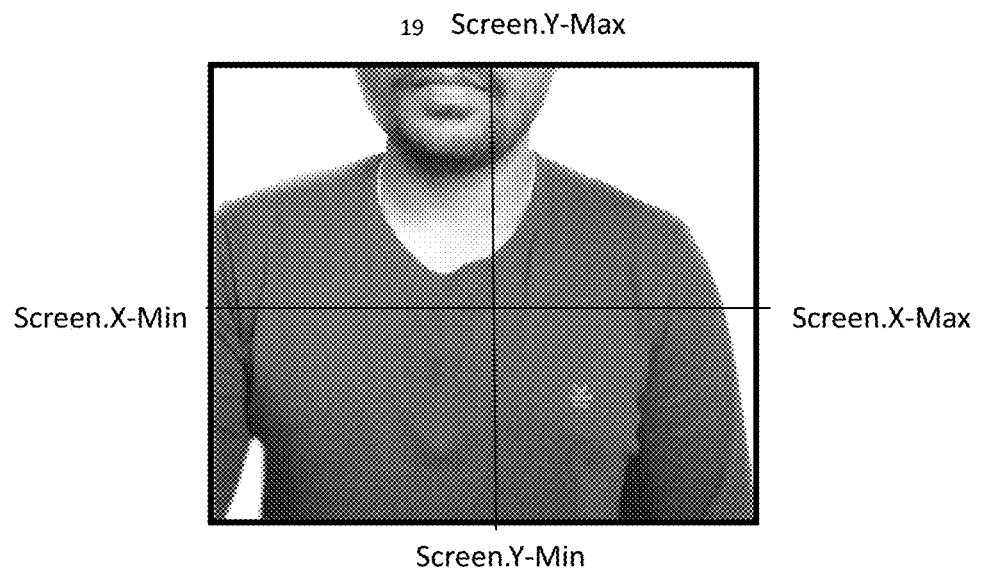
Figure 5C:
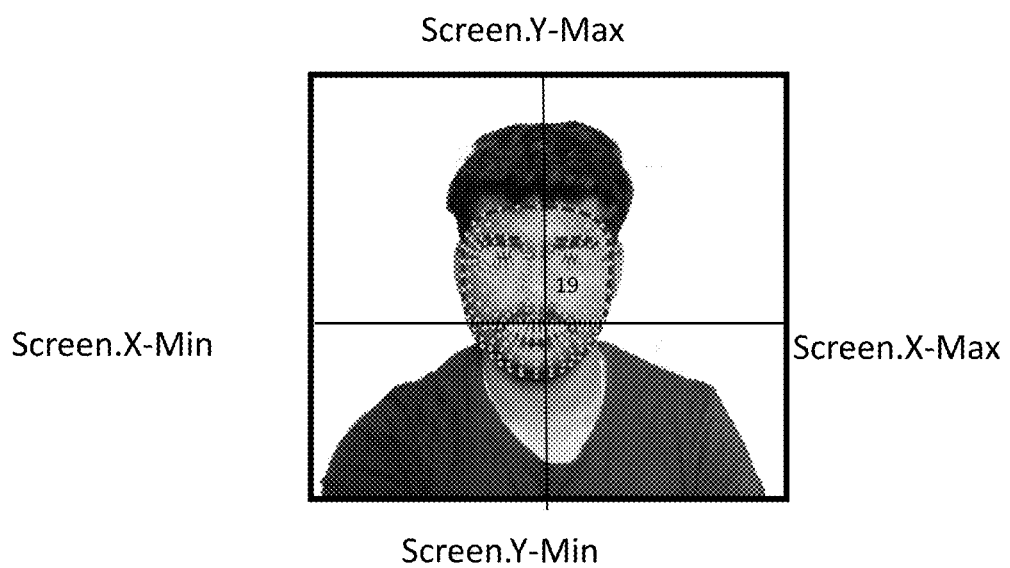

Once the values are calculated, there is a check to determine whether the nose landmark values are within the camera's field of view at step S308. In other words, there is a check to determine whether the X value of the nose landmark is between the maximum and minimum X values for the field of view and similarly to determine whether the Y value of the nose landmark is between the maximum and minimum Y values for the field of view. These maximum and minimum X and Y values effectively define a boundary area around a central portion of the image and the determination is whether the X and Y values of the nose landmark are within the central portion. In other words, the values must satisfy all of the following statements fora face to be detected:

nose value for X≤Max X value for camera field of view
  nose value for X≥X value for camera field of view
  nose value for Y≤Max Y value for camera field of view
  nose value for Y≥Y value for camera field of view If one or both of X and Y values are outside the range, the output is that a face is not detected (step S312) and thus the content is paused as explained previously. For example, as shown in FIG. 5a, the X value of the nose landmark is outside the range and as shown in FIG. 5b, the Y value of the nose landmark is outside the range. Thus, in both FIGS. 5a and 5b, no face is detected. If both the X and Y values are within range, the output is that a face is detected (step S310). An example of a successful detection of a face is shown in FIG. 5c.

It will be appreciated that the nose landmark is a convenient face landmark to use for face detection because the nose is relatively centrally located on a user's face. In a similar manner, an alternative face landmark may be used or a combination of face landmarks may be used in the face detection.

FIG. 6 illustrates one method for detecting whether a gesture has been made by the user which necessitates interaction with the humanoid presenter (e.g. teacher or assistant) or as described in FIGS. 2a and 2b makes the selection of the information to be displayed. The first steps are similar to those shown in FIG. 3. In a first step S600, an image is captured and in the next step S602, the image may be subject to any optional conversion which is needed prior to detecting landmarks on the image as shown at step S604. As described above, when the Unity (™) gaming engine is used, the WebCam Texture component in this environment may be used for these steps.

In this example, the next stage is to determine whether a user's face is detected in the image at step S606. The method of detecting a user's face may be as described in FIG. 3 and may use a holistic graph such as that shown in FIG. 4a. If no face is detected, the output may be that no gesture is detected as shown at step S630. When no gesture is detected, no action may be taken by the system although it will be appreciated that if a face is not detected, the content may be paused as described above.

The next stage is to calculate the number of hand landmarks which are present in the image at step S608. This may be done using a holistic graph comprising a plurality of landmark points such as that shown in FIG. 7a. This example of a holistic graph has 21 points for a hand and is provided in the Mediapipe (™) module. A table showing the labels for each of the landmark points is shown below and it will be appreciated that other suitable graphs may be used:

| Number | Label |
| --- | --- |
| 0 | Wrist |
| 1 | Thumb_CMC |
| 2 | Thumb_MCP |
| 3 | Thumb_IP |
| 4 | Thumb_TIP |
| 5 | Index_Finger_MCP |
| 6 | Index_Finger_PIP |
| 7 | Index_Finger_DIP |
| 8 | Index_Finger_TIP |
| 9 | Middle_Finger_MCP |
| 10 | Middle_Finger_PIP |
| 11 | Middle_Finger_DIP |
| 12 | Middle_Finger_TIP |

| Number | Label |
|---|---|
| 13 | Ring_Finger_MCP |
| 14 | Ring_Finger_PIP |
| 15 | Ring_Finger_DIP |
| 16 | Ring_Finger_TIP |
| 17 | Pinky_MCP |
| 18 | Pinky_PIP |
| 19 | Pinky_DIP |
| 20 | Pinky_TIP |

Each landmark is composed of x, y and z coordinates. As before, the x and y coordinates may optionally be normalized between 0 and 1 by the image width and height respectively. The x and y normalized landmark coordinates may then be multiplied by the width and height resolution of the image respectively to match the aspect ratio of the image to give X and Y values for the nose landmark. These values may be stored in a vector structure.

The next step S610 is to compare the total number of hand landmarks which were counted in the previous step with a hand landmark threshold to determine whether or not a hand has been detected. The threshold may be a sufficient number of landmarks which gives confidence that the hand has been detected. The threshold may be all the landmarks, e.g. 21 in the example above. If the threshold is not met, the output may be that no gesture is detected as shown at step S630. Otherwise, the process may continue to determine whether there is a gesture.

Figure 7A:
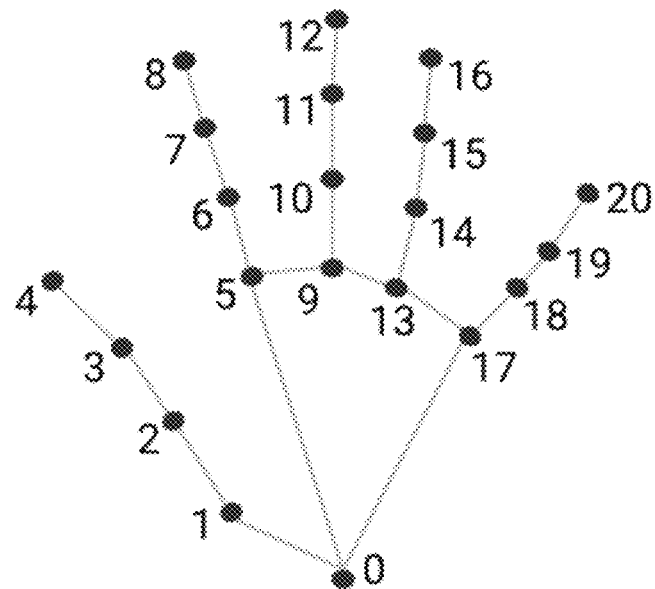
FIG. 7a is a holistic graph showing hand landmarks.
Figure 7B:
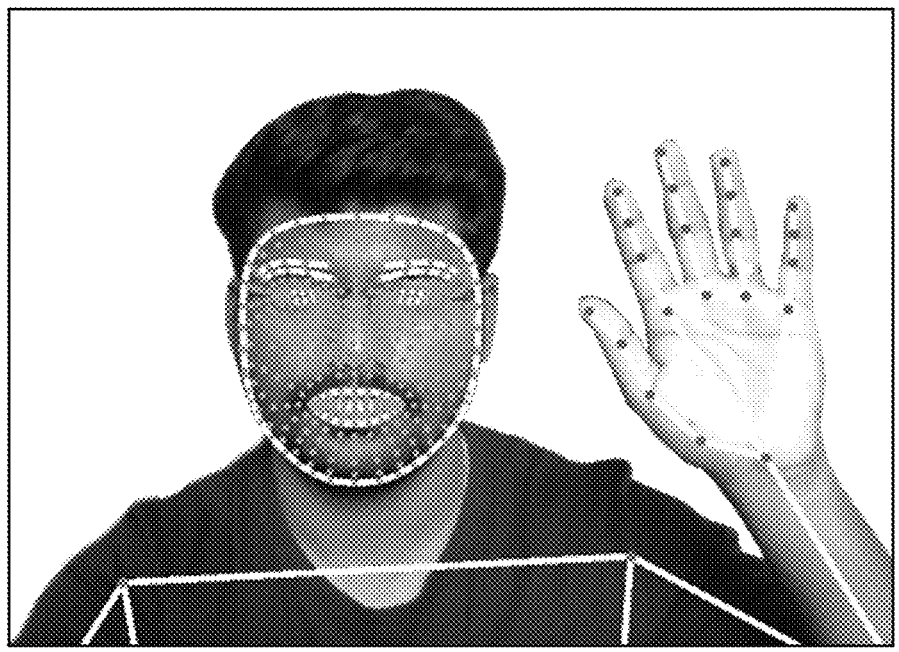
FIG. 7b is a sample image with the graph of FIG. 4a overlaid on a face and the graph of FIG. 7a overlaid on a hand.

FIG. 6 shows that the face and hand detection are done as separate steps but it will be appreciated that they may be done simultaneously. For example, FIG. 7b illustrates both holistic graphs overlaid on an image captured by the camera and in this example both a face and a hand are detected. If both a hand and a face are detected, the method may then proceed to see if the relative locations of the hand and face, and/or further details of the hand meet the requirements for a gesture to be detected.

Figure 8A:
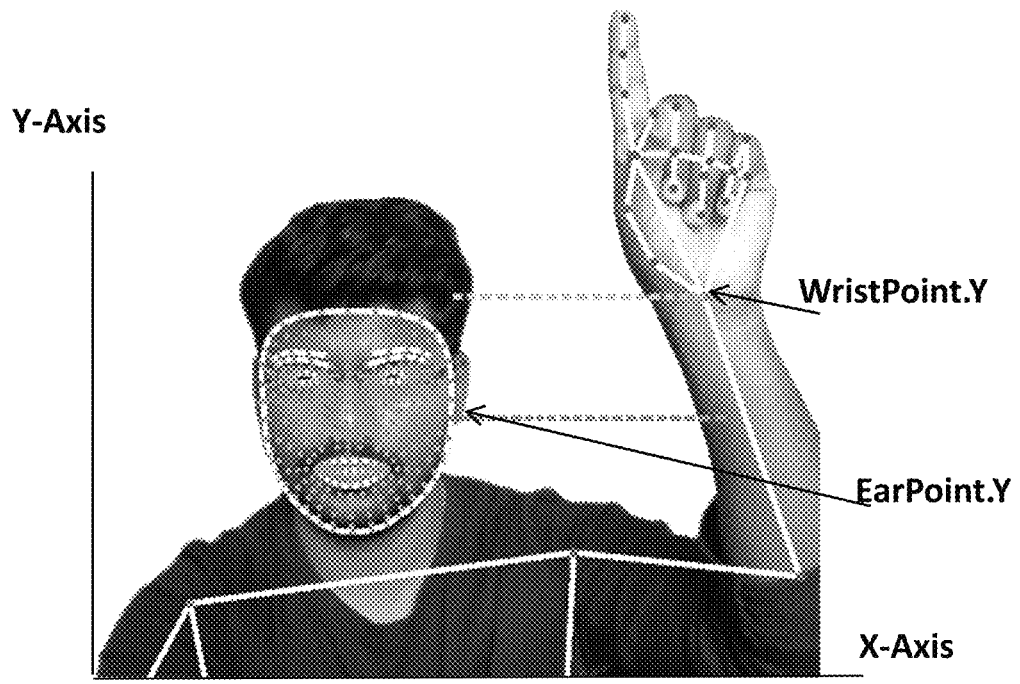
FIGS. 8a to 9c show images analyzed using the method of FIG. 6.
Figure 8B:
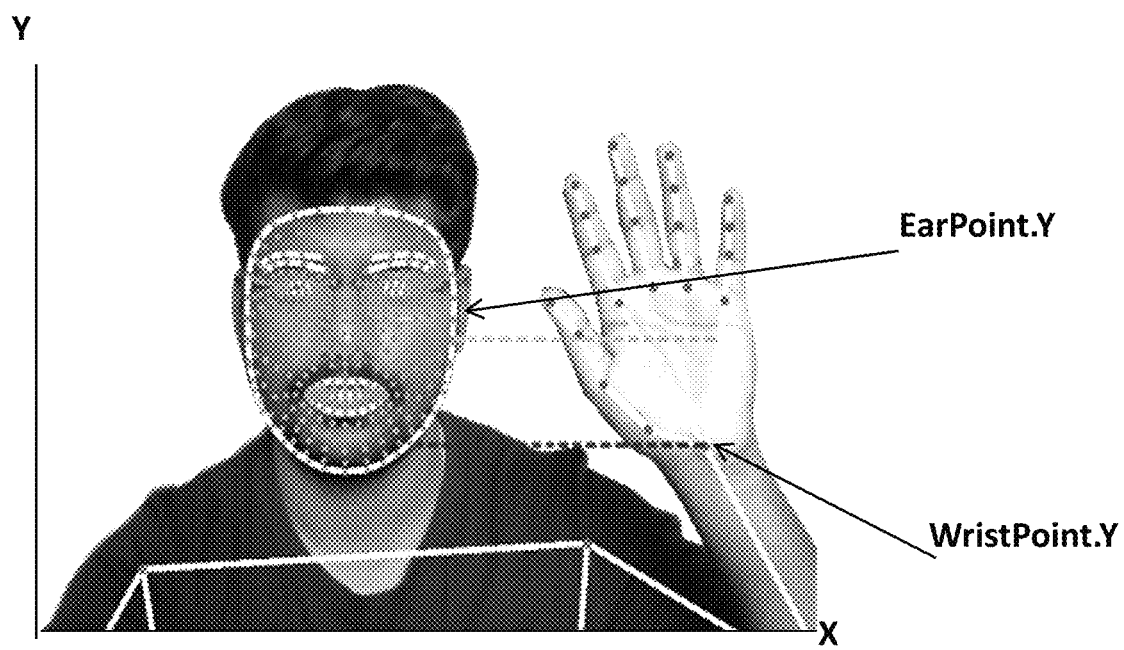

When the gesture is a hand being raised, the hand is typically higher than a user's face. This may be determined by obtaining, at step S612, a value for a particular landmark on the face, e.g. a value for the ear landmark, obtaining, at step S614 a value for a particular landmark on the hand, e.g. a value for the wrist landmark, and comparing the Y value of the obtained values to determine whether the hand is higher at step S616. If the Y value for the face landmark is lower than the Y value for the hand landmark, the hand is considered to be higher. For example, as shown in FIG. 8a, the wrist landmark has a Y value of 454 and the ear landmark has a Y value of 234 and thus the hand is considered to be higher. As shown in FIG. 8b, the wrist landmark has a Y value of 234 and the ear landmark has a Y value of 454 and thus the hand is considered to be lower. In the example of FIG. 8b, there is no gesture detected and thus the output is that no gesture is detected as shown at step S630.

When the gesture is indicative of a user wishing to ask a question, in addition to a hand being raised, at least the index finger is typically pointed. Thus when a raised hand is detected at step S616, a further check of the nature of the raised hand may be carried out. One way of doing this is to obtain the coordinate values for two landmarks on the index finger as shown at step S618. For example, the x and y values for the middle joint and the tip of the index finger may be obtained. Referring to FIG. 7a, these two landmarks are denoted by points 6 and 8 (Index_Finger_PIP and Index_Finger_TIP, respectively). Once the values have been obtained, they can be compared and a first condition to be met can be expressed as:

Index_Finger_PIP value for Y <Index_Finger_PIP value for Y

Figure 9A:
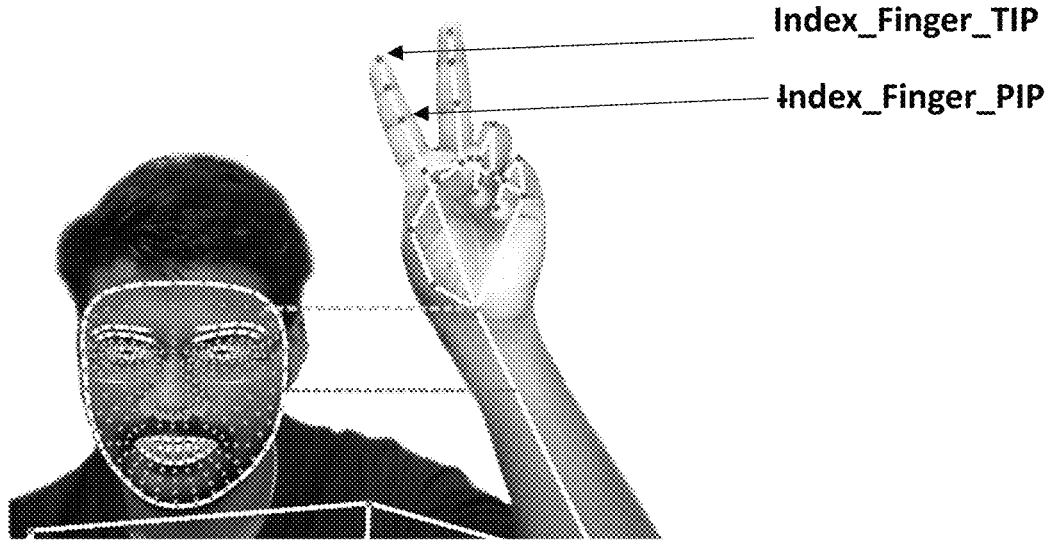
FIGS. 9d and 9e illustrate the detail of checking the angle of a user's finger used in the method of FIG. 6.
FIG. 9f illustrates several variations of the hand gesture which would be accepted by the method of FIG. 6.
Figure 9B:
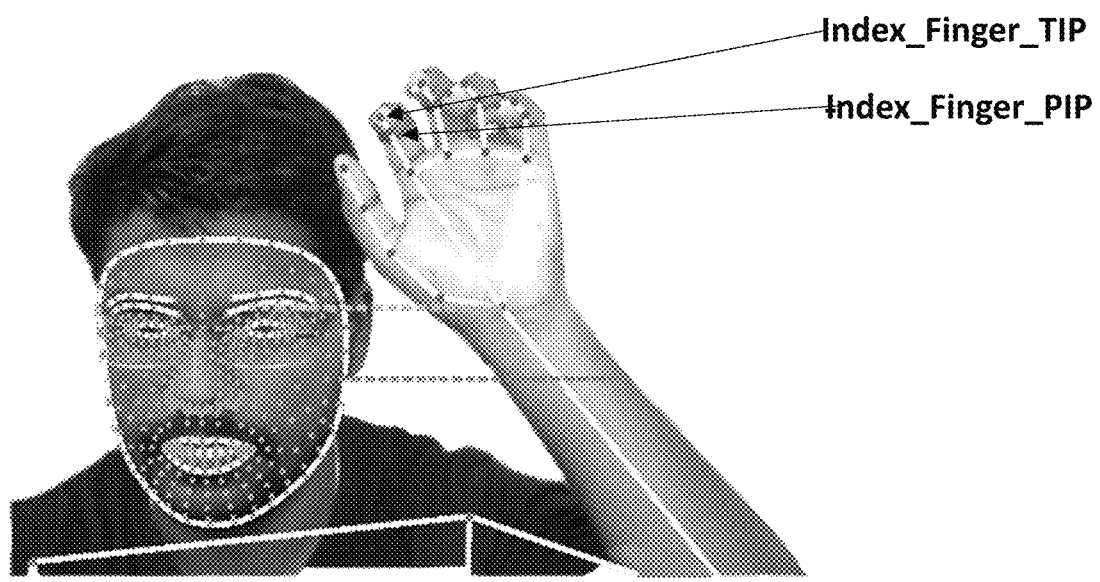
Figure 9C:
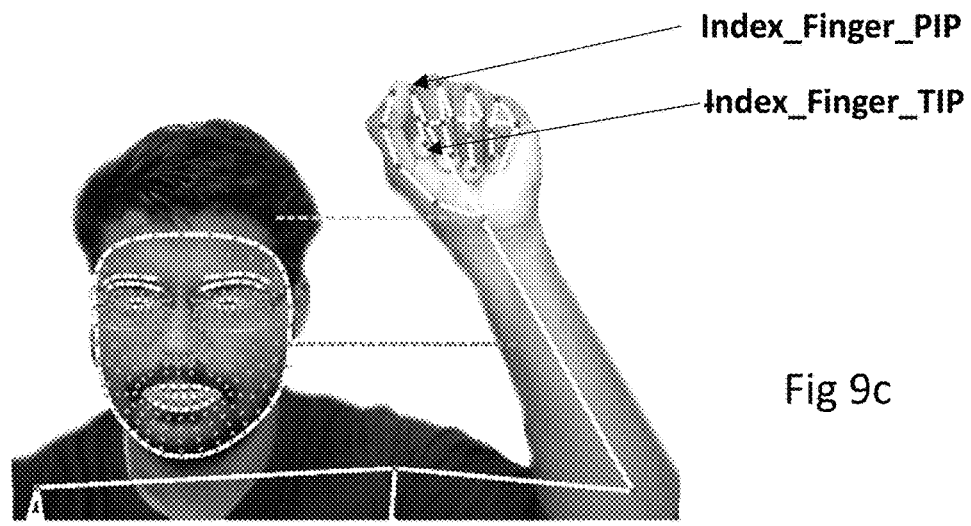

FIGS. 9a and 9b illustrates an example in which this condition is clearly met and in both examples the tip of the user's index finger is above the middle joint of the user's finger. FIG. 9c is an example showing when the first condition is not met because the middle joint of the user's finger is above the tip of the user's index finger.

Figures 9D, 9E:
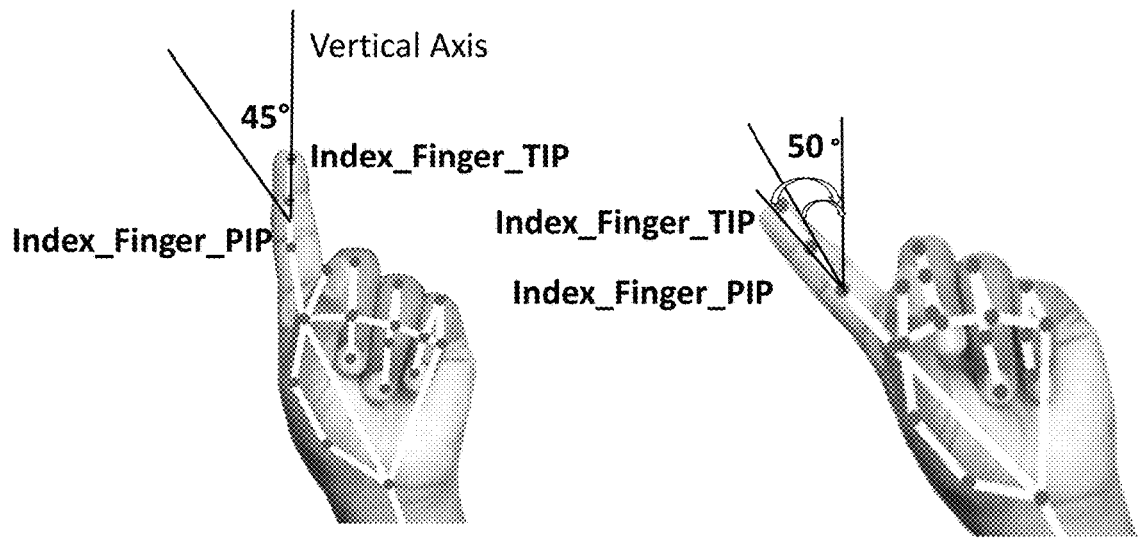

In addition to obtaining the x and y values for these two locations, the angle of the finger may be also calculated at step S620. The angle may be calculated using the angle of the line between the two landmarks as illustrated in FIGS. 9d and 9e. The angle of the line between the landmarks is compared to a Y axis which is parallel to the Y axis of the image. The second condition to be met may be expressed as:

Angle≤45 degrees (wrt to vertical axis)

In FIG. 9d, the index finger is almost vertical and thus the angle of the line between the tip and middle joint meets the requirement above. In FIG. 9e, the index finger is angled away from vertical and the angle of the line between the tip and middle joint is greater than 45 degrees and thus does not meet the requirement above.

Figure 9F:
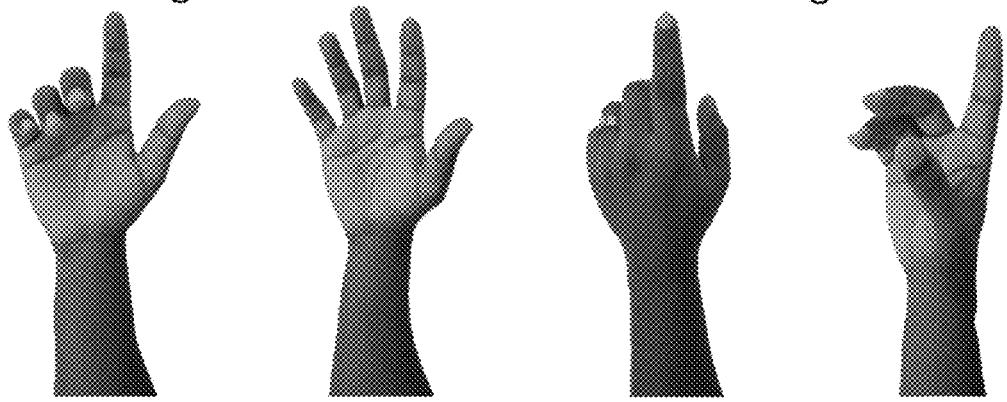

At step S620, there is a determination whether the index finger is pointed. In this example, this is done by checking that both of the conditions specified above are met. If both conditions are met, i.e. the index finger is pointed at an acceptable angle, the output is that a gesture is detected as shown at step S632. FIG. 9f illustrates several variations of the hand gesture which would be accepted. Otherwise, if the gesture is not detected, this is output as shown at step S630.

In the flowchart of FIG. 6, the various determinations are shown consecutively but it will be appreciated that they can be carried out at the same time or in a different order. In this example, both of the conditions needs to be met for a gesture to be detected. Considering the examples shown in FIGS. 8a and 8b, the image shown in FIG. 8a would result in an output that a gesture is detected because both the hand and face are visible, the hand is high enough and the finger is pointed. By contrast, the image in FIG. 8b would not be accepted because although both the hand and face are visible and the finger is pointed at the right angle, the hand is not high enough. It will be appreciated that there are other variations which will be accepted as well as other variations that will not be accepted.

Figure 10:
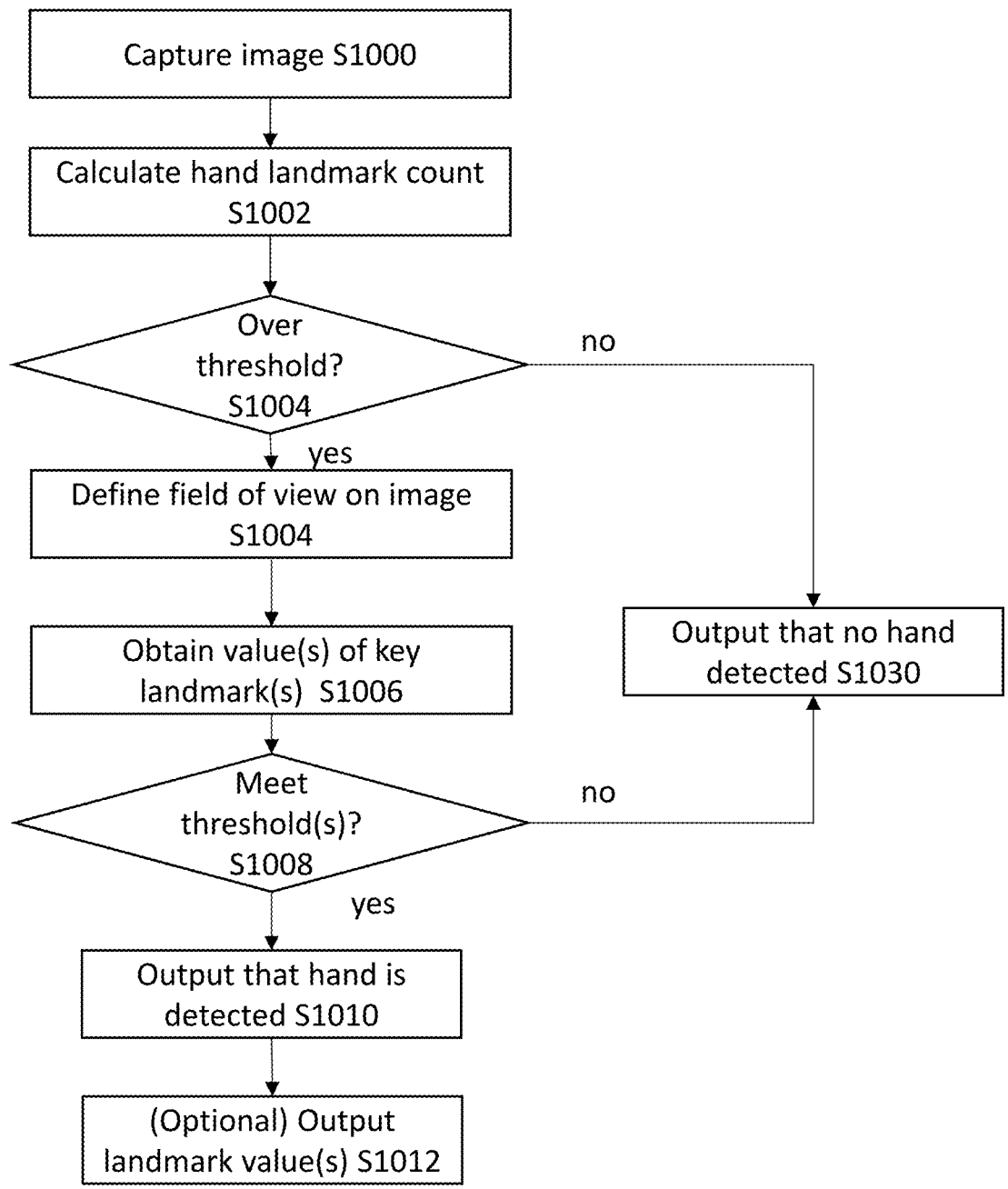
FIG. 10 is a flowchart of an alternative method for detecting whether a hand is in the field of view of the camera.

In FIG. 6, detecting whether a user's hand was in shot was done by considering whether all landmarks were detected (steps S608 and S610). FIG. 10 illustrates an alternative method for detecting whether a hand is in the field of view of the camera (i.e. whether a hand is in the image) and this may be particularly useful for detecting how many fingers a user is displaying to make the selections as described above. The first steps of FIG. 10 are similar to those shown in FIG. 6. In a first step S1000, an image is captured and in the next stage the number of hand landmarks which are present in the image is calculated at step S1002. It will be appreciated that the image conversion step and detecting landmarks step which are not shown may be carried out as previously described in relation to FIG. 6.

In this example, the threshold for step S1004 may be 20 rather than the full 21 landmarks. However, this is merely an indicative number and 21 or a different number may also be used. If the threshold is not met, there is a negative output that there is no hand at step S1030. If the threshold is met and there are 20 or more landmarks counted, the method may next determine whether the hand is in the field of view of the camera.

The field of view may be defined at step S1006 by defining a boundary area on the image which is outside the field of view. For example, as shown in FIGS. 11a to 11d, the boundary area may extend around the edges of the image and the depth of the boundary area may be approximately 10% of the width and depth of the original image. The boundary area effectively defines a central portion of the image within which it is desired by the hand is located. It will be appreciated that 10% is merely indicative and moreover the percentage may be different or the same for width and depth of the image. The next step is to obtain the x and y values for one or more key landmarks on the hand. Typically, these key landmarks represent the extremities of a user's hand. For example, the x and y values for the wrist point and the tip of middle finger may be obtained (e.g. as described above by obtaining normalised values and then multiplying). Referring to FIG. 7a, these two landmarks are denoted by points 0 and 12 (Wrist and Middle_Finger_TIP, respectively).

There is a check to determine whether the X values of the key landmarks are between the maximum and minimum X values for the field of view and similarly to determine whether the Y values of the key landmarks are between the maximum and minimum Y values for the field of view. When the X and Y axes are centered on the image, the values must satisfy all of the following statements for a face to be detected:

wrist value for X <Max X value for camera field of view (i.e. <40% of X)
 middle finger tip value for X <Max X value for camera field of view (i.e. <40% of X)
 wrist value for X >Min X value for camera field of view (i.e. >40% of −X)
 middle finger tip value for X >Min X value for camera field of view (i.e. >40% of −X)
 wrist value for Y <Max Y value for camera field of view (i.e. <40% of Y)
 middle finger tip value for Y <Max Y value for camera field of view (i.e. <40% of Y)
 wrist value for Y >Min Y value for camera field of view (i.e. >40% of −Y)
 middle finger tip value for Y >Min Y value for camera field of view (i.e. >40% of −Y)

If any one of the statements is not satisfied, the hand is determined to be outside the field of view and hence no hand is detected. If all the thresholds are satisfied, the hand is determined to be inside the field of view and there is an output that the hand is detected at step S1010. Optionally, the information regarding one or more of the values used in the determination may be output at step S1012. For example, the location of the middle finger tip may be output.

Figure 11A:
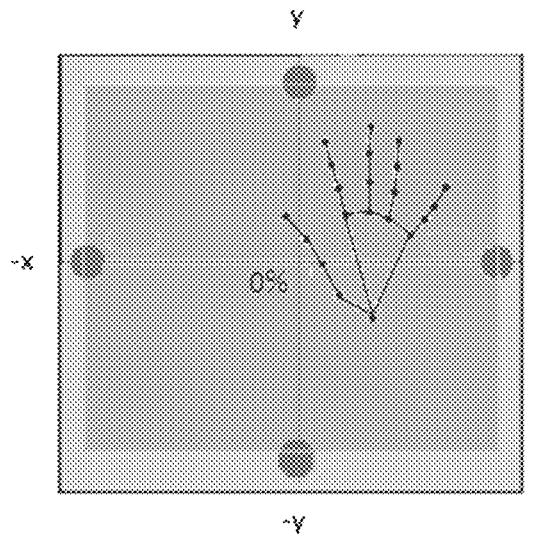
FIGS. 11a to 11d illustrate different hand locations relative to a boundary area defined on an image.
Figure 11B:
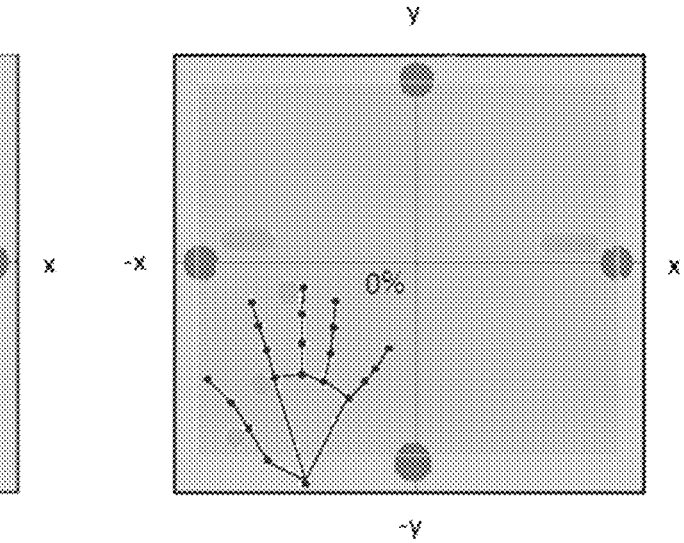
Figure 11C:
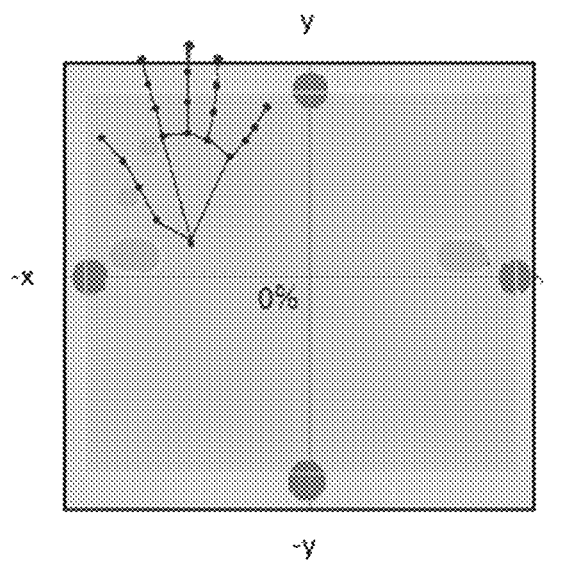
Figure 11D:
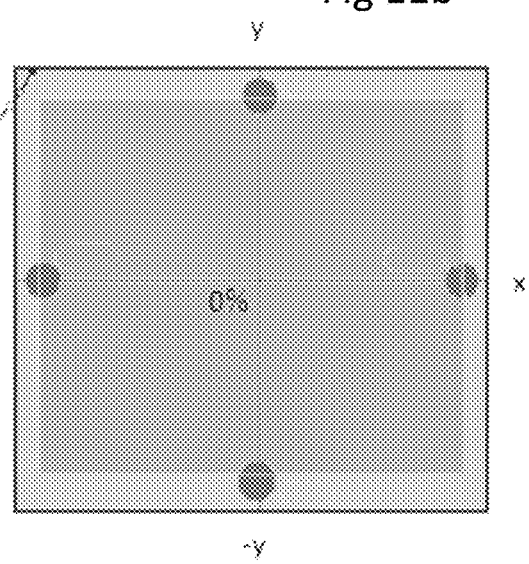

FIGS. 11a to 11d illustrate different locations of a holistic graph overlaid on a hand within an image. In FIG. 11a, all hand landmarks are within the image and no hand landmarks are within the boundary area. Thus all landmarks meet the conditions above and are within the field of view. Accordingly, the output is that a hand is detected. In FIG. 11b, all hand landmarks are within the image and thus the determination at step S1004 is positive. However, a key landmark (wrist) is within the boundary area. Thus the hand is not within the field of view and the output is that a hand is not detected. In FIG. 11c, fewer than 20 hand landmarks are within the image and thus the determination at step S1004 is negative. Furthermore, a key landmark (middle fingertip) is outside the image and hence does not meet the thresholds of step S1008. Thus the output is that a hand is not detected. In FIG. 11d, one hand landmark is within the image but all hand landmarks are outside the field of view. Accordingly, the output is that a hand is not detected.

The gesture detection described above can be applied in the banking environment. This provide a real life experience through interaction between user device (e.g. terminal or personal device) and a server to provide a meta human character interaction which recreates an experience of visiting a digital branch to complete banking activities. The system and method described above is user friendly and can provide for banking services for the disabled customers. The gesture detection may be used to provide an improved level of interactivity in an educational environment. It is noted that in recent years, more educational content is being offered online and there are now several educational apps which are available in the market. Some of the educational content is provided as a monologue from the teacher (or instructor) and a student has the option to pause or play the content using appropriate control interfaces such as keyboards or touch sensitive screens.

As an example of an online educational environment, US10,609,333 describes a system for interactive online collaboration in which a student sends a live image of their paper through an image-sharing subsystem to the instructor's personal computing or mobile communications device. An annotation subsystem allows the instructor to mark said image of the student's paper and a background-subtraction subsystem allows a background-free image of the instructor to appear on said image of the student's paper. The system gives the impression that the instructor is present and collaborating on the student's work.

Figure 12B:
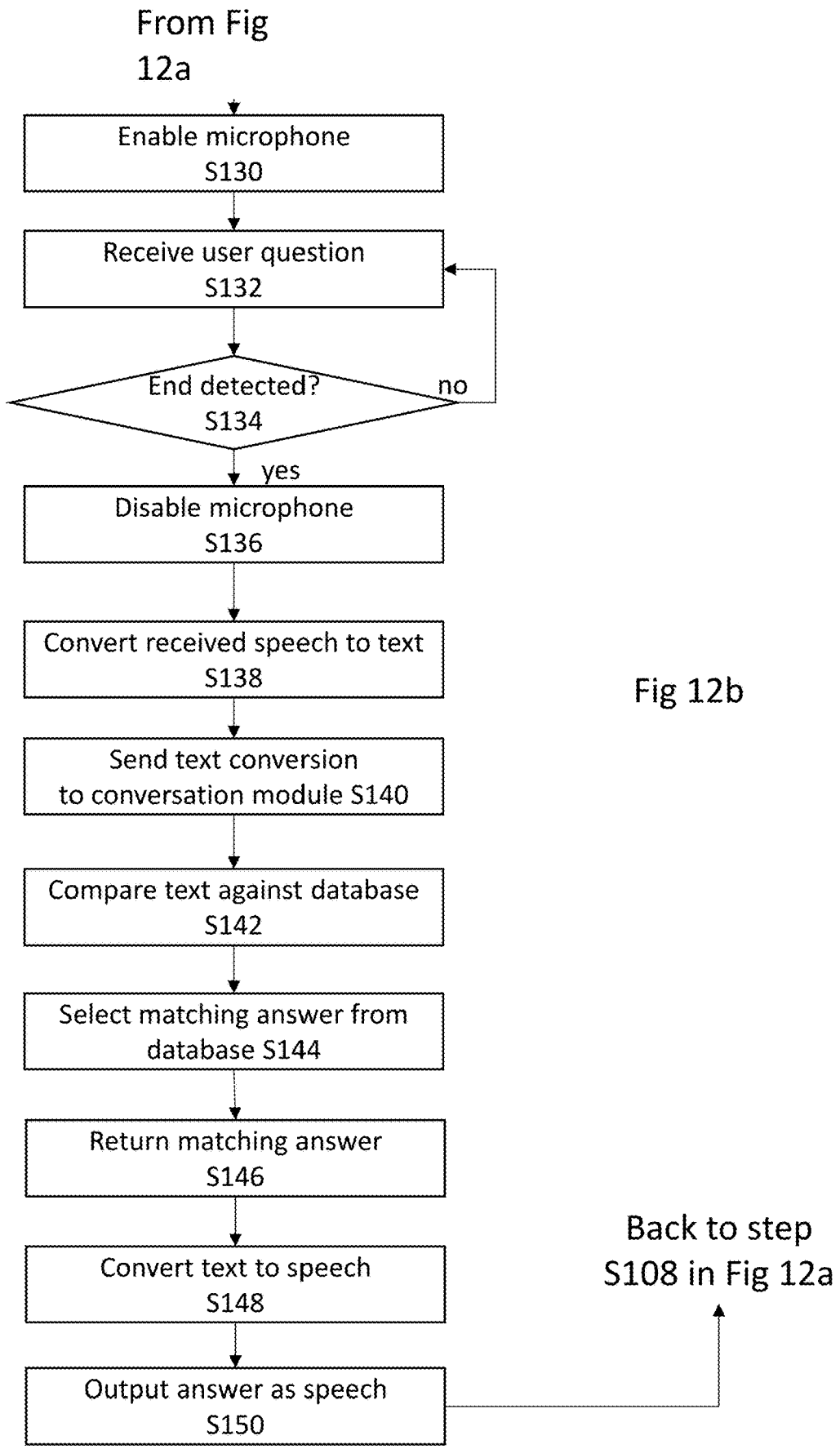

FIGS. 12a and 12a show the steps which may be carried out by the system of FIG. 1 to generate the interactive educational environment which provides greater interactivity for a student that the known systems mentioned above. In a first step S100, a user launches the interactive classroom app on the user device (e.g. in the gaming engine) and thus the user device is connected to the server to receive the data to display the interactive classroom. After launch, there is a step S102 in which there is an initialization of the machine learning module comprising the face, gesture, and speech detection modules. The interactive classroom environment is also initiated at step S104. As an alternative to the initiation step occurring after the initialization step as indicated, the two steps may be reversed in order or carried out simultaneously. Once the classroom environment is initiated, the user is able to select a particular topic and/or lesson at step S106. The selections may be limited to authorized students and may be further limited to courses on which they are enrolled and/or subjects based on their grade.

The selected content is presented by an artificial teacher in the form of an avatar or humanoid. Before the content is presented, there is a step S108 to check whether the face of the user is detected. This ensures a level of interactivity because the content will only be presented when the face of the student is in front of the camera. If the face is detected, the presentation by the teacher will begin (step S110), and if no face is detected, the presentation will be paused (step S112). It will be appreciated that if the presentation has not yet begun, the presentation continues to be paused.

Another level of interactivity is included by determining whether a gesture is detected at step S114. The gesture may be in the form of a raised hand. If a gesture is detected, the presentation is paused at step S116. Alternatively as shown at step S118, if no gesture is detected, the presentation will continue. As indicated by the dotted lines, the process continually loops back to detect the user's face and/or gestures during the whole presentation or else it will pause the course.

After a gesture is detected and the presentation is paused, the next step is to initiate the simulated interaction with the teacher. In this arrangement, the user is able to verbally ask a question and thus as shown in FIG. 12a, the first step S130 is to enable the microphone automatically for the student to ask the question. The student can then start asking their question (at step S132). The machine learning module determines whether the end of the speech is detected (step S134). If the end is not detected, the user device continues receiving the question from the user. Once the end of speech is detected at step S136, the microphone is automatically disabled.

The received question is then converted from speech to text at step S138. The text version of the question is then sent to the conversation module at step S140. The conversation module may then compare the received text conversion (step S142) to questions stored in its associated database. If any questions in the database match the received text conversion, the corresponding answer in the database may be selected at step S144. The matching answer which is typically a text answer is returned to the app (i.e. to the gaming engine) at step S146 so that it can be presented to the user.

Figure 12C:
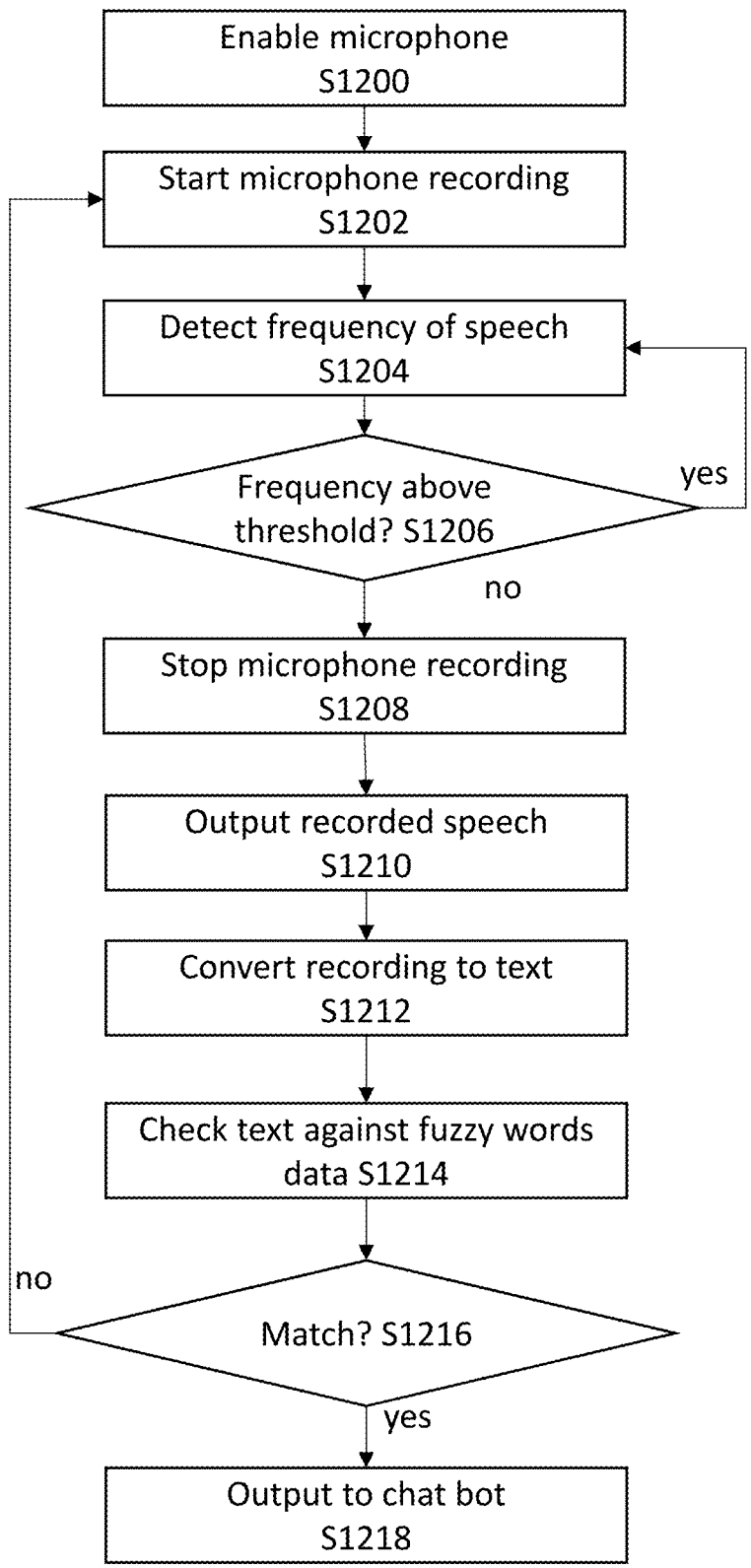
FIG. 12c is a flowchart setting out more detail in relation to the steps shown in FIG. 12b.

The text answer is then converted to speech at step S148 and output as speech to the user at step S150. The output is presented orally by the artificial teacher so that it appears that the teacher has reacted to and responded to the student's question. Once the answer has been presented, the presentation can be restarted and the process continually loops back to detect the user's face to make sure that the presentation should continue and/or detect other gestures to be processed as shown in FIG. 12a. Before looping back, the presentation may be restarted with the teacher asking the question "are you happy with the answer". If the response is "No", the student is asked to repeat the question. Otherwise, the presentation moves to the next item being studied FIG. 12c sets out more detail in relation to the steps shown in FIG. 12a. In a first step S1200, the microphone is enabled and at step S1202, the recording is started (as an example, in an Android system both steps may be carried out for using a call to a native Android (™) plugin class using Android Bridge (™)). The frequency of the speech being recorded is detected at step S1204 and the frequency is compared to a frequency threshold at step S1206. If the frequency is above the frequency threshold, the user is still speaking and thus the end of the student's question has not yet been detected. Accordingly, the method loops back to detecting the frequency. If the frequency is below the frequency threshold, the end of the question has been detected and as shown at step S1208, the recording by the microphone is stopped. Again, the control of the microphone may be done using the appropriate calls, e.g. Android (™) plugin class using Android Bridge (™). The frequency threshold is indicative of the end of speech and may for example be 160 Hz.

As shown at step S1210, the recorded speech (i.e. student's question or query) is output. The output is sent for speech to text conversion at step S1212. This conversion may be done using any suitable technique, for example using the jar plugin using callback to the native Android (™) conversion methods.

After conversion, there may be an optional check before sending the text to the conversation module as described in FIG. 12a. For example, the converted text may be checked as shown at step S1214 by comparing it with fuzzy data. Any suitable algorithm for performing the check may be used, e.g. the Soundex algorithm which is a phonetic algorithm for indexing names by sound. The next stage is to determine whether there is a match between the converted text and the fuzzy data (step S1216). If there is no match, the microphone recording is started again and the method loops back to step S1202. If there is a match, the text is then output at step S1218 to the conversation module (conversational bot API) to determine the answer to the question.

Figure 13A:
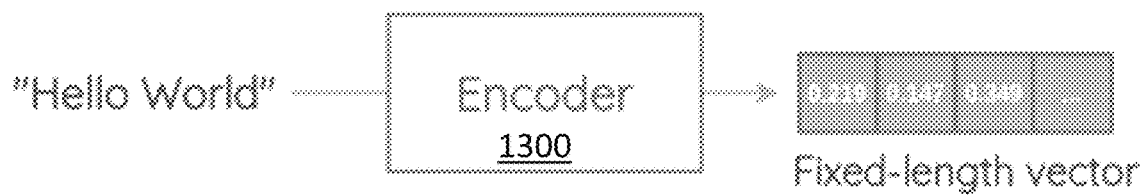
FIG. 13a is a schematic block diagram of a conversation module.

As described above, the conversation module uses an artificial intelligence or machine learning model. A simple schematic of the components of an example conversation module which is based on TensorFlow (™) are shown in FIG. 13a. TensorFlow is a well-known platform for machine learning. The conversation module comprises an encoder 1300 which may be described as a universal sentence encoder (USE). The encoder 1300 has been trained using Provisioner by inserting questions and answers (frequently asked questions—FAQ) into Provisioner which is a chatbot admin portal. It is noted that a pre-trained universal sentence encoder is available in the Tensor-flow hub. A suitable file (such as a pickle file in Python) is generated after training the conversation module. The response generated from the trained module is based on the Pearson correlation score which is above 98%. The Pearson correlation score is a well-known scoring mechanism described for example in https://en.wikipedia.org/wiki/Pearson_correlation_coefficient. Otherwise, similar questions will be available as "did you mean".

As shown in FIG. 13a, the model takes as input strings of words (e.g. in English) such as "Hello World" and outputs a vector representation of the string. Converting to a vector is well known and techniques like Word2vec and Glove can be used from https://www.tensorflow.org/tutorials/text/word2vec and https://nlp.stanford.edu/projects/glove/. The vector may be a fixed dimensional embedding (e.g. 512 dimensions) which encodes the meaning of the sentence and which can be used for downstream tasks such as searching for similar documents. Each input string (i.e. input sentence) may be pre-processed using tokenization techniques such as the Penn Treebank PTB. In other words, the sentence may be converted to lowercase and tokenized into tokens.

The mistakes when carrying out the downstream tasks are used to update the encoder as a feedback to improve the embedding. The same embedding is used to solve multiple tasks (e.g. skip-thought, response prediction, natural language inference) and thus typically only captures the most informative features and discards noise. Such an embedding may be considered to be a generic embedding which transfers universally to a wide variety of NLP tasks such as relatedness, clustering, paraphrase detection and text classification.

Figure 13B:
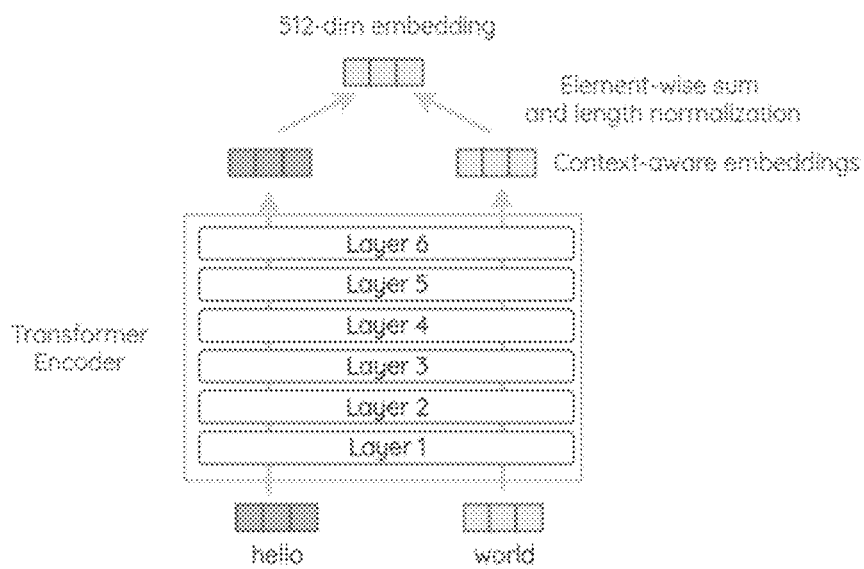
FIG. 13b is a schematic block diagram of an alternative conversation module.
Figure 13C:
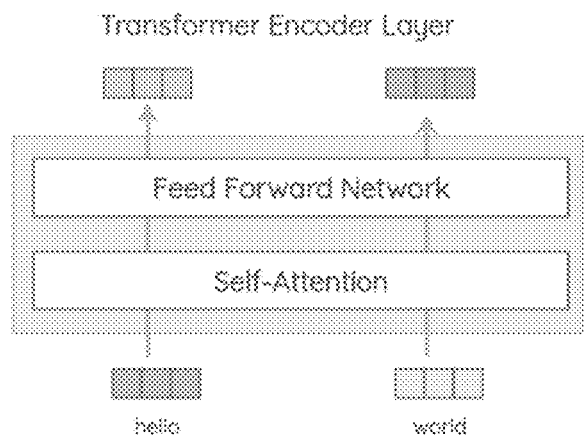
FIG. 13c shows the detail of each layer in the module of FIG. 13b.

FIG. 13b illustrates an example encoder which may be used and FIG. 13c illustrates the schematic detail of each layer in the encoder of FIG. 13b. The encoder comprises six stacked transformer layers, each of which has a self-attention module followed by a feed-forward network. Each word, e.g. "hello" and "world" in the input string is separately processed by each layer. The self-attention module in each layer takes the word order and surrounding context into account when generating the word representation. As shown in FIG. 13c, each of these context-aware embeddings of each separate word is added together element-wise and then normalized by dividing by the square root of the length of the sentence. The normalization takes account of the sentence-length difference. The final output is the vector, e.g. the 512 dimensional embedding.

Such a multi-layered transformer encoder has a relatively complex architecture. Its improved accuracy on downstream tasks offsets its requirements of higher memory and higher computing resource usage. Furthermore, the compute time scales dramatically with the length of the sentence as self-attention has O(n2) time complexity with the length of the sentence.

Figure 14A:
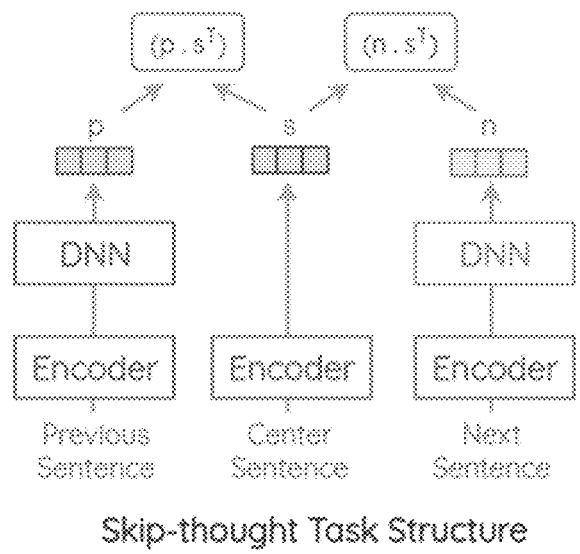
FIG. 14a is a schematic block diagram of an alternative module for a skip-thought task.

FIG. 14a illustrates an alternative architecture for the conversation module which is particularly useful for the skip-thought task which is one of the multiple tasks on which the encoder is trained. Skip-thought is based on the idea that the current sentence can be used to predict the previous and the next sentence. For example, the current sentence "Captain America tries lifting Thor's hammer" may be used to predict the previous sentence "Iron man fails to lift Thor's hammer" as well as the next sentence "The hammer moves a bit". More information can be found in "Skip-Thought Vectors" by Kiros et al published in Advances in Neural Information Processing Systems NeurIPS in 2015.

FIG. 14a illustrates that the conversation module uses a plurality of encoders, one for each of the three sentences. For both the previous and next sentences, the encoder uses a DNN (direct neural network). Thus, instead of using a full LSTM encoder-decoder architecture, only an encoder based on transformer or DNN is used. The structure was trained using the Wikipedia and News Corpus.

Figure 14B:
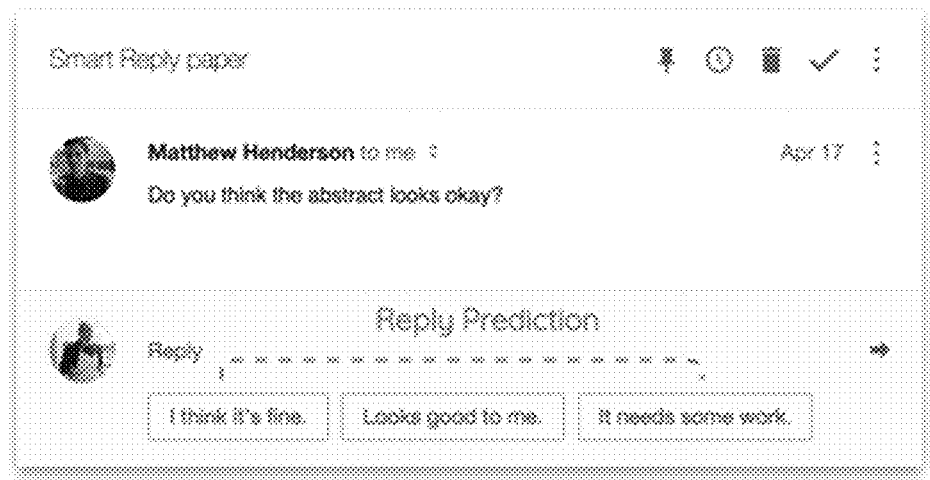
FIG. 14b illustrates a sample question and a set of predicted replies.

Another task on which the conversation module is trained is conversational input-response prediction. In this task, the correct response for a given input needs to be predicted. The prediction may be done from a list, e.g. a list of correct responses and other randomly sampled responses. FIG. 14b illustrates an example of this task in which the question is "do you think the abstract looks okay?". The list of predicted responses is shown as "I think it's fine", "looks good to me" and "it needs some work".

Figure 14C:
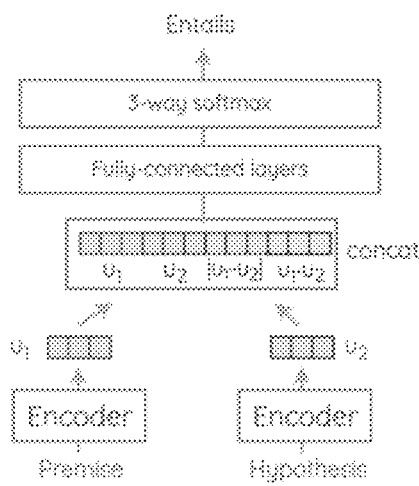
FIG. 14c is a schematic block diagram of an alternative module for the chatbot module which is particularly useful for the conversational input-response prediction task.

FIG. 14c illustrates an alternative architecture for the conversation module which is particularly useful for the conversational input-response prediction task. The architecture comprises an encoder for each of the premise and the hypothesis. Each of the output 512 dimension embeddings $u_1$ and $u_2$ are obtained and are concatenated together with their L1 distance (i.e. $|u_1-u_2|$) and their dot product (angle). This concatenated vector is passed through the fully connected layers and a SoftMax function which is a well-known final layer described for example in https://en.wikipedia.org/wiki/Softmax_function and is applied to get the probability for entailment, contradiction and/or neutral classes.

As set out in FIG. 12a, there is a step of matching the question to an answer. This may be achieved by any suitable technique. For example, the embeddings produced by the Universal Sentence Encoder as described above may be approximately normalized. After normalization, the semantic similarity of two sentences can be computed as the inner product of the encodings.

Figure 15:
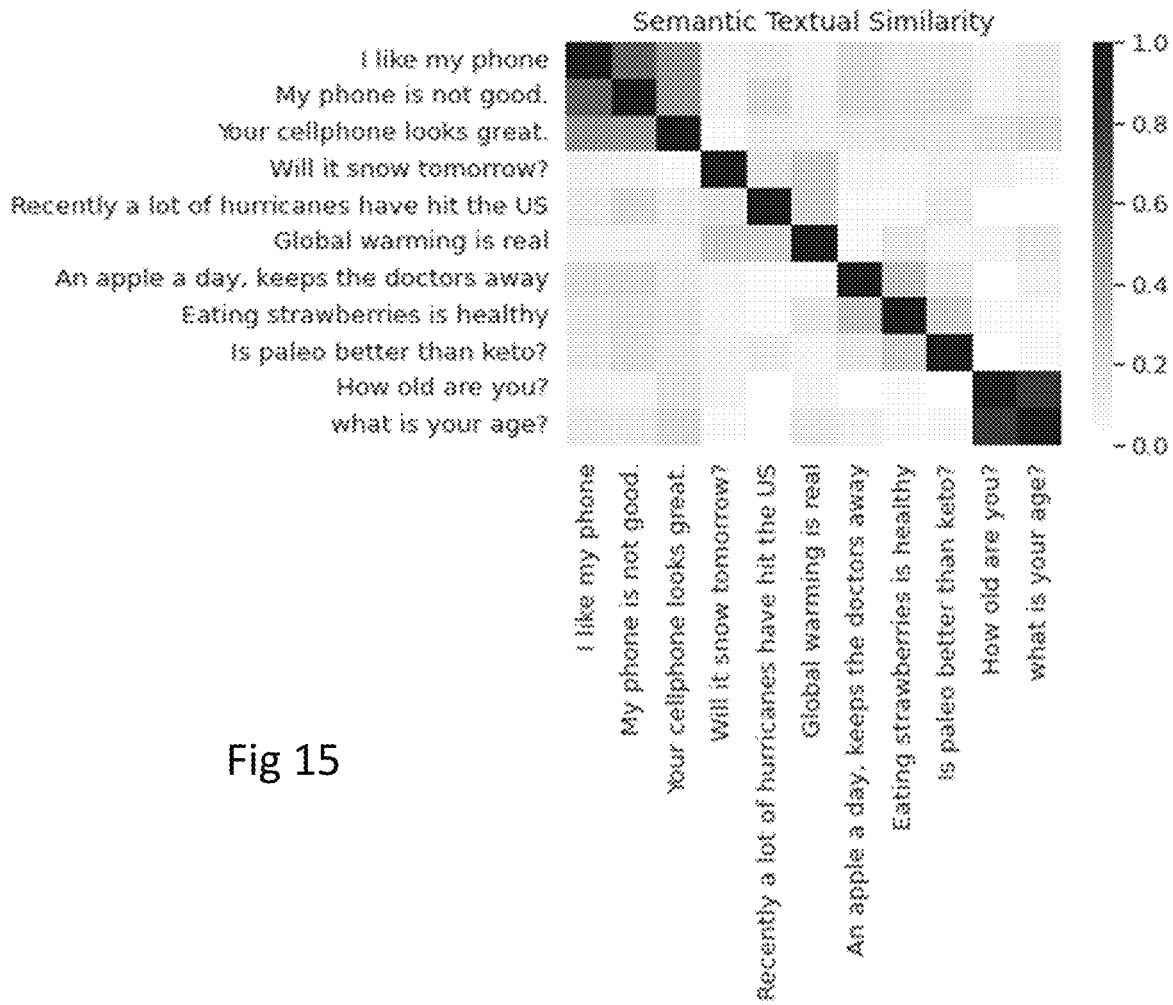
FIG. 15 is a heat map of the similarity between a selection of sentences.

FIG. 15 illustrates a heat map of the similarity between a selection of sentences which are set out below together with the relevant grouping (e.g. smartphones, weather etc.).
  # Smartphones
  "I like my phone",
  "My phone is not good.",
  "Your cell phone looks great.",
  # Weather
  "Will it snow tomorrow?",
  "Recently a lot of hurricanes have hit the US",
  "Global warming is real",
  # Food and health
  "An apple a day, keeps the doctors away",
  "Eating strawberries is healthy",
  "Is paleo better than keto?",
  # Asking about age
  "How old are you?",
  "what is your age?", The graph of FIG. 15 is a 9×9 matrix where each entry [i, j] is colored based on the inner product of the encodings for sentence i and j.

The STS Benchmark provides an intrinsic evaluation of the degree to which similarity scores computed using sentence embeddings align with human judgments. The benchmark requires systems to return similarity scores for a diverse selection of sentence pairs. The Pearson correlation is then used to evaluate the quality of the machine similarity scores against human judgments.

FIG. 1 shows a database containing the question and answer pairs. When generating this database, it can be helpful to removing duplicate text strings, in particular repeated answer statements. This may be done by calculating a semantic similarity score (through the inner product of encodings as mentioned above), identifying duplicate statements as ones having a score above a threshold, e.g. 0.8. The duplicate statements are then removed.

Figure 16:
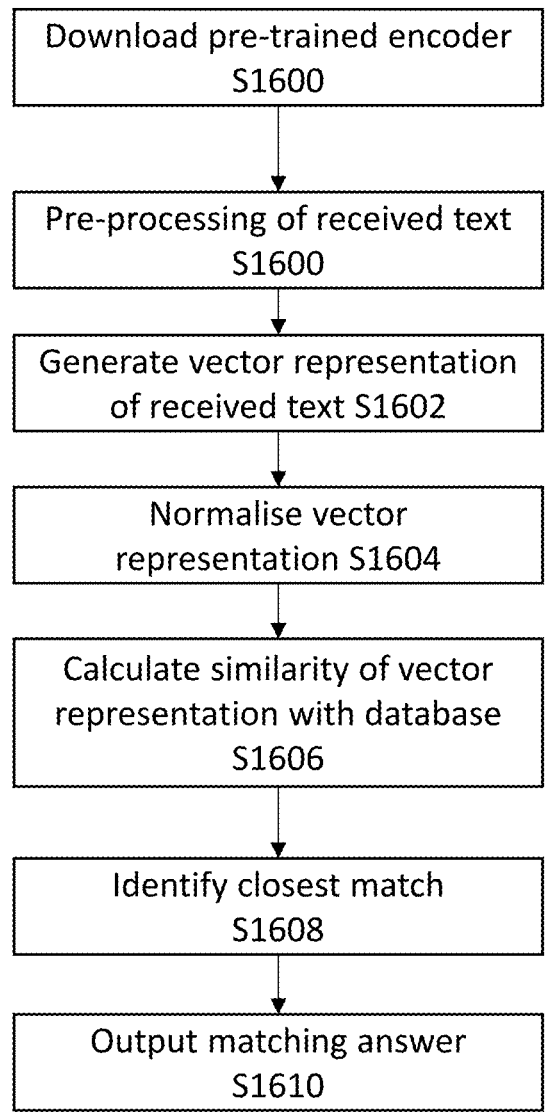
FIG. 16 is a flowchart showing how the conversation module identifies an answer.

FIG. 16 is a flowchart showing more detail on how the conversation module generates a response to the question asked by a student. In a first step S1600, a pre-trained Universal Sentence Encoder is downloaded to the user device (i.e. locally stored) so that each time a question needs to be processed, it is not necessary to download the encoder. As explained above, a suitable pre-trained Universal Sentence Encoder is publicly available in Tensorflow-hub. Such an encoder is optimized for greater-than-word length text and can be applied to sentences, phrases, or short paragraphs. Typically, the encoder module is about 800 MB which means that depending on the network for a user device, it might take a while to load the first time. Once downloading, loading the model should be faster as modules are cached by default. Further, once a module is loaded to memory, inference time should be relatively fast. The encoder may be downloaded with two variations i.e., one trained with a transformer encoder as detailed above and the other trained with Deep Averaging Network (DAN). The two have a trade-off of accuracy and computational resource requirement. The Transformer encoder typically has higher accuracy but it is computationally more intensive. The DAN encoder is computationally less expensive and with little lower accuracy.

Once the encoder is downloaded, in the next step S1602, the text conversion which is received by the conversation as an output of FIG. 12 is optionally pre-processed, e.g. by conversion into lower case and by generating tokens as described above. In a next step S1604, the encoder generates a 512-dimensional vector representation from the pre-processed text. As explained above, the encoder may use a self-attention mechanism to preserve context from the sentence. Alternatively, the encoder may use a deep averaging network (DAN) to perform both unigram and bigram embedding which can then be passed to a deep neural network (DNN) to obtain the vector embedding.

A vector is an array of numbers of a particular dimension. For example, a vector of size 5×1 contain 5 numbers and can be thought of as a point in 5D space. If there are two vectors each of dimension 5, they can be thought of two points in a 5D space. Thus, one way to calculate the similarity of the two vectors is to calculate how close or distant those two vectors are based on a distance measure between them. For example, the corresponding vector of "cat" will be closer to "dog" than "eagle". The vector representation is for a complete sentence not a single word and in sentence embedding, the semantic information also needs to be represented in the vector so that context is easier to understand.

Context may be obtained by breaking down into multiple sentences using Text Blob. After obtaining the vector representation for every sentence, cosine similarity may be measured for every sentence—question pair for feature creation. Question root may then be matched to all roots or sub roots of a sentence. This results in several roots because there are typically various verbs in a sentence. If the question root is present in sentence roots, then there is a possibility for getting an answer to that question by that sentence. So, for every sentence one feature was created and the value can be either 0 or 1. If the question root is present in the sentence roots, it is represented with 1 else 0. Before comparing question roots and roots of sentences we have performed stemming. After integrating cosine distance and root match in comprehension for 10 sentences total, we got 20 features while 0-9 is the range for the target variable. After training, logistic regression, support vector machine, k-nearest neighbors, random forest, gradient boosting and classifier techniques may be used. The output is a matrix of dimension 5*512. (Each sentence is a vector of size 512). Since the values are normalized, the inner product of encodings can be treated as a similarity matrix.

The transformer encoder may provide a minimal code snippet to convert a sentence into a tensor containing its sentence embedding. The transformer-based sentence encoding model constructs sentence embedding using the encoding sub-graph of the transformer architecture. This sub-graph uses attention to compute context-aware representations of words in a sentence that consider both the ordering and identity of all the other words. The context-aware word representations are converted to a fixed-length sentence encoding vector by computing the element-wise sum of the representations at each word position.

The Universal Sentence Encoder makes getting sentence-level embedding as easy as it has historically been to lookup the embedding for individual words. The sentence embedding can then be trivially used to compute sentence-level meaning similarity as well as to enable better performance on downstream classification tasks using less supervised training data. The sentence encoding models are publicly available on the TensorFlow hub and a sample script for embedding a sentence using the USE is shown below:
  import tensorflow_hub as hub
  embed =hub.Module (https://tfhub.dev/google/"universal-sentence-encoder/1")
  embedding =embed (["The quick brown fox jumps over the lazy dog."])

Even though limited amounts of training data are available for many NLP tasks, particularly in view of the high cost of annotating supervised training data, sentence embedding can be used to obtain surprisingly good task performance with remarkably little task-specific training data. The Universal Sentence Encoder makes getting sentence-level embedding as easy as it has historically been to lookup the embedding for individual words. The embedding produced by the Universal Sentence Encoder may then be approximately normalized as at step S1604. The normalized sentence embedding can then be trivially used to compute sentence-level meaning similarity to sentences within the database. For example, the semantic similarity of two sentences can be trivially computed as the inner product of the encodings. As another example, cosine similarity may be calculated as shown below:

$$sim(u, v) = \left(1 - \arccos\left(\frac{u \cdot v}{\|u\|\|v\|}\right)\right)$$

where u, v are the vector representations which are being compared.

The best match, i.e. the vector representation with the highest similarity score, can then be identified at step S1608 and the answer which is associated with this best match is output at step S1610.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Although a few preferred embodiments have been described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method for providing interaction between a user using a household user device selected from the group consisting of a mobile phone, a tablet, a personal computer, a laptop, a smart TV, a user terminal and a set-top box and an interactive environment generated by a server, the method comprising:
connecting the user device to the server to receive a presentation from a humanoid presenter within the interactive environment;
capturing, using a camera connected to the user device, an image of the user;
processing, using a machine learning module within the user device, the image to detect whether a face of the user is within the image;
analyzing the detected face to authenticate the user;
displaying, on a display screen of the user device, the received presentation, in an instance in which the user is authenticated;
capturing, using a camera connected to the user device, at least one further image of the user while the presentation is being displayed;
processing, using the machine learning module within the user device, the at least one further image to detect whether a face of the user is within the at least one further image;
when the user's face is not detected in the at least one further image, automatically logging out of the interactive environment; and
when the user's face is detected in the at least one further image, processing, using the machine learning module within the user device, the at least one further image to detect a gesture from the user; and
when a gesture is detected:
determining an input from the user;
identifying a response corresponding to the determined input;
presenting, by the humanoid presenter displayed on the display screen, the identified response to the user; and
updating the display of the received presentation.

2. The method of claim 1, wherein the interactive environment is a banking environment and the displayed presentation is a menu of services for the user showing a service and an associated gesture.

3. The method of claim 2, wherein the identified response comprises an action to be carried out on behalf of the user, and the method further comprises issuing an instruction to carry out the action.

4. The method of claim 2, wherein the identified response is banking information for the user and the method further comprises connecting to a database to retrieve the banking information whereby presenting the identified response comprises an audio output of the retrieved banking information and updating the display comprises displaying the retrieved banking information.

5. The method of claim 1, wherein processing the at least one image to detect a gesture from the user comprises detecting whether a hand is present in the at least one image.

6. The method of claim 5, wherein determining the input from the user comprises processing the at least one image to determine how many landmarks from different fingers are detectable; and
identifying a response is based on the determined number of landmarks from different fingers.

7. The method of claim 1, further comprising processing the at least one image to detect a gesture indicative of the user wishing to exit the interactive environment, and when the gesture is detected, disabling the camera of the user device.

8. The method of claim 1, further comprising, before displaying the received presentation, authenticating the user using user information in the form of a QR code.

9. The method of claim 1, wherein detecting whether a face of the user is within the at least one image may comprise:
detecting a plurality of face landmarks within the at least one image;
calculating a co-ordinate value for a key face landmark, wherein the co-ordinate value is indicative of the location of the key face landmark within the image; and
determining whether the co-ordinate value is within a field of view of the camera.

10. The method of claim 9, wherein the co-ordinate value comprises a x coordinate value and a y coordinate value and determining whether the co-ordinate value is within a field of view of the camera comprises:
determining whether the x coordinate value is between a minimum value and a maximum value for the x coordinate value of the at least one image; and
determining whether the y coordinate value is between a minimum value and a maximum value for the y coordinate value of the at least one image.

11. A non-transitory computer readable medium having computer readable program code, wherein when the code is executed on a user device, the user device is configured to carry out the method of claim 1.

12. A computer-implemented method for providing interaction between a user in the form of a student using a household user device selected from the group consisting of a mobile phone, a tablet, a personal computer, a laptop, a smart TV, a user terminal and a set-top box and an interactive environment in the form of an educational environment generated by a server, the method comprising:
connecting the user device to the server to receive a presentation from a humanoid presenter within the interactive environment, wherein the presentation is in the form of educational content;
displaying, on a display screen of the user device, the received presentation;
capturing, using a camera connected to the user device, at least one image of the user while the presentation is being displayed;
processing, using a machine learning module within the user device, the at least one image to detect whether a face of the user is within the at least one image;
when the user's face is not detected in the at least one image, pausing the display of the received presentation; and
when the user's face is detected in the at least one image, processing, using the machine learning module within the user device, the at least one image to detect a gesture from the user by detecting whether a hand is present in the image and determining the relative location of the detected hand to the detected face; and
when a gesture is detected:
pausing the display of the received presentation;
receiving an input from the user;
identifying an answer corresponding to the received input;
presenting, by the humanoid presenter displayed on the display screen, the received answer to the user; and
resuming the display of the received presentation.

13. The method of claim 12, wherein when a gesture is detected, the method further comprises:
automatically enabling a microphone whereby a question from the student is received by the microphone capturing the student's speech;
detecting the end of the student's speech; and
when the end is detected, automatically disabling the microphone.

14. A system for providing an interactive environment, the system comprising:
a server which is configured to transmit a presentation from a humanoid presenter within the interactive environment;
a household user device selected from the group consisting of a mobile phone, a tablet, a personal computer, a laptop, a smart TV, a user terminal and a set-top box which is connectable to the server, the user device comprising:
a display screen for displaying the received presentation;
a machine learning module; and
a camera for capturing at least one image of the user and which is configured to; and
an authentication module for authenticating the user based on the captured at least one image before displaying the received presentation;
wherein the machine learning module is configured to:
process the at least one image to detect whether a face of the user is within the at least one image;
in an instance in which the user's face is not detected in the at least one image, when the presentation is being displayed, automatically log out of the interactive environment; and
in an instance in which the user's face is detected in the at least one image, process the at least one image to detect a gesture from the user; and
in an instance in which a gesture is detected by the machine learning module, the user device is further configured to:
determine an input from the user;
identify a response corresponding to the determined input;
present, by the humanoid presenter displayed on the display screen, the identified response to the user; and
update the display of the received presentation.

15. The system of claim 14, wherein the interactive environment is a banking environment and the displayed presentation is a menu of services for the user showing a service and an associated gesture.

16. The system of claim 15, wherein the identified response comprises an action to be carried out on behalf of the user, and the user device is further configured to issue an instruction to carry out the action.

17. The system of claim 16, wherein the identified response is banking information for the user and whereby presenting the identified response comprises an audio output of banking information retrieved from a database and updating the display comprises displaying the retrieved banking information.

18. The system of claim 14, wherein the machine learning module is configured to process the at least one image to detect whether a hand is present in the at least one image.

* * * * *